United States Patent [19]

Willis et al.

[11] Patent Number: 5,329,369
[45] Date of Patent: Jul. 12, 1994

[54] ASYMMETRIC PICTURE COMPRESSION

[75] Inventors: Donald H. Willis; Barth A. Canfield, both of Indianapolis, Ind.

[73] Assignee: Thomson Consumer Electronics, Inc., Indianapolis, Ind.

[21] Appl. No.: 946,346

[22] PCT Filed: May 29, 1991

[86] PCT No.: PCT/US91/03733

§ 371 Date: Nov. 9, 1992

§ 102(e) Date: Nov. 9, 1992

[87] PCT Pub. No.: WO91/19384

PCT Pub. Date: Dec. 12, 1991

[30] Foreign Application Priority Data

Jun. 1, 1990 [GB] United Kingdom ............... 9012326

[51] Int. Cl.$^5$ .................. H04N 5/262; H04N 9/74; H04N 3/223
[52] U.S. Cl. .................. 348/556; 348/578; 348/568; 348/704
[58] Field of Search .................. 358/183, 22, 180; H04N 5/262, 9/74, 3/223

[56] References Cited

U.S. PATENT DOCUMENTS

| 4,622,577 | 11/1986 | Reitmeier et al. | 358/11 |
| 4,878,117 | 10/1989 | Ikehira et al. | 358/183 |
| 5,065,243 | 11/1991 | Katagiri | 358/183 |
| 5,130,800 | 7/1992 | Johnson | 358/183 |
| 5,138,455 | 8/1992 | Okumura | 358/22 |

Primary Examiner—James J. Groody
Assistant Examiner—Sherrie Hsia
Attorney, Agent, or Firm—Joseph S. Tripoli; Joseph J. Laks; Harvey D. Fried

[57] ABSTRACT

A wide screen television apparatus comprises a video display having a first format display ratio of width to height, for example approximately 16×9. A first video signal defines a first picture. A second video signal defines a second picture in a second format display ratio of width to height smaller than the first format display ratio, for example approximately 4×3. A video signal processor asymmetrically compresses the second picture, for example 4:1 horizontally and 3:1 vertically. A video memory stores lines of video of the asymmetrically compressed picture. Another video signal processor combines portions of lines of video in the first video signal with the stored lines of video of the asymmetrically compressed picture for simultaneous display of the first and second pictures. The asymmetrically compressed second picture is displayed without aspect ratio distortion. The second picture can form an inset within the first picture. A single picture display can itself comprise a full screen of pictures from one source of from multiple sources. A video signal processor for a video display apparatus comprises a circuit for selectively changing the width and height of a picture by first and second factors respectively to control aspect ratio distortion of the picture and a circuit for generating the aspect ratio controlled picture as an output for display by the video display apparatus. The processor includes a circuit for digitizing the video signal, for subsequent subsampling.

29 Claims, 12 Drawing Sheets

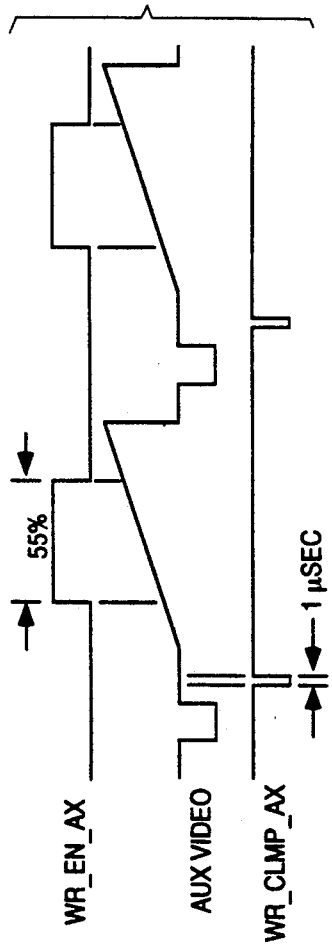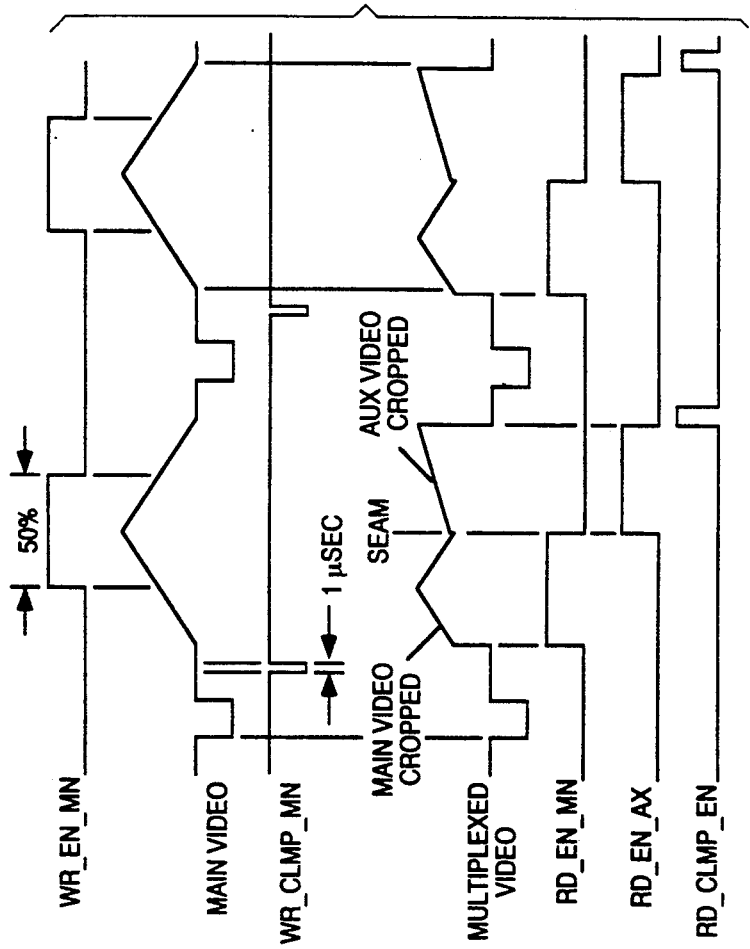

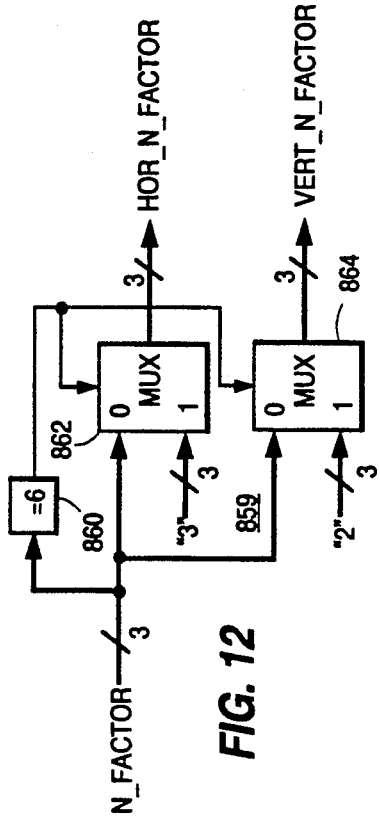
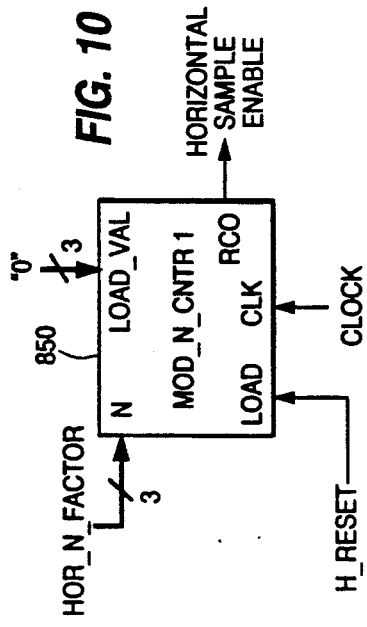

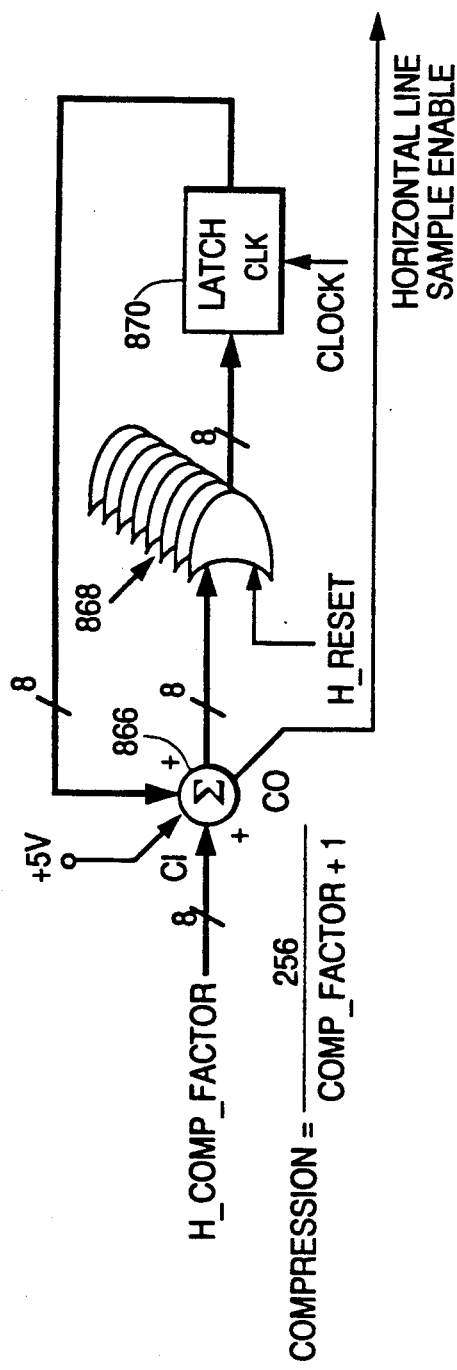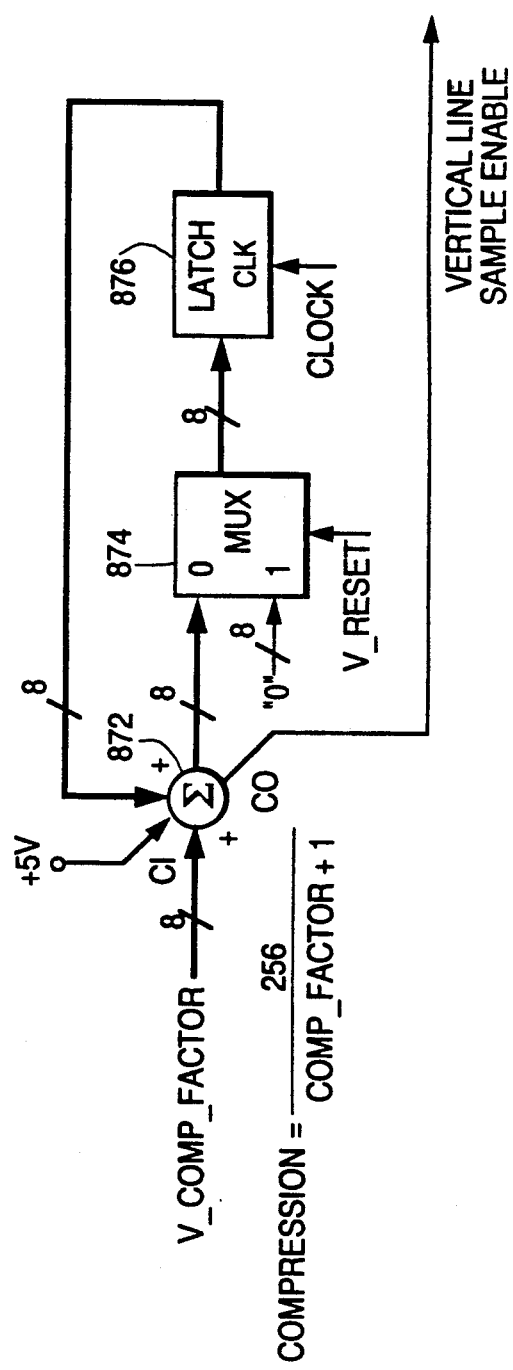

1

ASYMMETRIC PICTURE COMPRESSION

The invention relates to the field of televisions, and in particular, to televisions having a wide display format ratio screen. Most televisions today have a format display ratio, horizontal width to vertical height, of 4:3. A wide format display ratio corresponds more closely to the display format ratio of movies, for example 16:9. The invention is applicable to both direct view televisions and projection televisions.

Televisions having a format display ratio of 4:3, often referred to as 4×3, are limited in the ways that single and multiple video signal sources can be displayed. Television signal transmissions of commercial broadcasters, except for experimental material, are broadcast with a 4×3 format display ratio. Many viewers find the 4×3 display format less pleasing than the wider format display ratio associated with the movies. Televisions with a wide format display ratio provide not only a more pleasing display, but are capable of displaying wide display format signal sources in a corresponding wide display format. Movies "look" like movies, not cropped or distorted versions thereof. The video source need not be cropped, either when converted from film to video, for example with a telecine device, or by processors in the television.

Televisions with a wide display format ratio are also suited to a wide variety of displays for both conventional and wide display format signals, as well as combinations thereof in multiple picture displays. However, the use of a wide display ratio screen entails numerous problems. Changing the display format ratios of multiple signal sources, developing consistent timing signals from asynchronous but simultaneously displayed sources, switching between multiple sources to generate multiple picture displays, and providing high resolution pictures from compressed data signals are general categories of such problems. Such problems are solved in a wide screen television according to this invention. A wide screen television according to various inventive arrangements is capable of providing high resolution, single and multiple picture displays, from single and multiple sources having similar or different format ratios, and with selectable display format ratios.

Television with a wide display format ratio can be implemented in television systems displaying video signals both at basic or standard horizontal scanning rates and multiples thereof, as well as by both interlaced and noninterlaced scanning. Standard NTSC video signals, for example, are displayed by interlacing the successive fields of each video frame, each field being generated by a raster scanning operation at a basic or standard horizontal scanning rate of approximately 15,734 Hz. The basic scanning rate for video signals is variously referred to as $f_H$, 1 $f_h$, and 1 H. The actual frequency of a 1 $f_H$ signal will vary according to different video standards. In accordance with efforts to improve the picture quality of television apparatus, systems have been developed for displaying video signals progressively, in a noninterlaced fashion. Progressive scanning requires that each displayed frame must be scanned in the same time period allotted for scanning one of the two fields of the interlaced format. Flicker free AA-BB displays require that each field be scanned twice, consecutively. In each case, the horizontal scanning frequency must be twice that of the standard horizontal frequency. The scanning rate for such progressively scanned or flicker free displays is variously referred to as 2 $f_H$ and 2 H. A 2 $f_H$ scanning frequency according to standards in the United States, for example, is approximately 31,468 Hz.

Television apparatus with conventional format display ratios can be equipped for displaying multiple pictures, for example from two video sources. The video sources may be the tuner in the television, a tuner in a video cassette recorder, a video camera, and others. In a mode often referred to as picture-in-picture (PIP), the tuner in the television provides a picture filling most of the screen, or display area, and an auxiliary video source provides a small inset picture generally within the boundaries of the larger picture. A PIP display mode in a wide screen television apparatus is shown in FIG. 1(c). In many instances, the inset picture can be positioned in a number of different locations. In wide screen television apparatus, another display mode is possible, and is referred to as picture-outside-picture (POP). In this mode, several inset auxiliary pictures can share a common boundary with a main picture. A POP display mode in a wide screen television apparatus is shown in FIG. 1(f). Another display mode is often referred to as channel scan, wherein a large number of small pictures, each from a different channel source, fill the screen in a freeze frame montage. There is no main picture, at least in terms of size. A channel scan display mode in a wide screen television apparatus is shown in FIG. 1(i).

Horizontal scanning is accomplished in the same amount of time in a wide screen television apparatus as in a conventional television apparatus. However, the distance of the horizontal scan is greater in the wide screen television. This will stretch the picture horizontally, creating significant aspect ratio distortion of the images in the displayed picture. Accordingly, problems can be encountered when displaying a video signal having a conventional 4×3 display format ratio on a wide screen television apparatus, for example one having a 16:9 format display ratio, also referred to as 16×9. These particular format display ratios would result in a horizontal stretching or expansion by a factor of 4/3. This is a problem for displaying pictures having a 4×3 display format ratio as a main picture and as an auxiliary picture, such as a PIP or POP. This is also a problem for PIP and POP modes even if the main picture originates from a video source having a 16×9 format display ratio which matches the display means of the television apparatus.

Digital circuits, sometimes referred to generally as picture-in-picture processors, are available which can implement PIP and channel scan modes in a conventional television apparatus. One such picture-in-picture processor is designated as a CPIP chip and is available from Thomson Consumer Electronics, Inc. The CPIP chip is described more fully in a publication entitled The CTC 140 Picture in Picture (CPIP) Technical Training Manual, available from Thomson Consumer Electronics, Inc., Indianapolis, Ind. Such picture-in-picture processors are not suitable for implementing special display modes, such as PIP, POP and channel scan, in wide screen television apparatus. If an auxiliary picture developed by such a picture-in-picture processor from an auxiliary video source were displayed on a wide screen television apparatus without an external speedup circuit, the auxiliary picture, or pictures, would be geometrically distorted as described above. The auxiliary picture would exhibit a horizontal expansion by a factor of 4/3 due to the wider horizontal scanning of the wider picture tube, whether direct view or projection. If an external speedup circuit were used, the auxiliary picture would appear without aspect ratio distortion, but would not fill the screen or fill the portion of the screen otherwise allotted for the auxiliary display.

It is an inventive arrangement to provide a wide screen television apparatus which can implement special display modes as are now possible in conventional television apparatus, such as PIP and channel scan, as well as POP. In accordance with this aspect of the invention, a wide screen television is provided with a signal processor for distorting a video signal, for example an auxiliary video signal, such that upon subsequent display the auxiliary picture will exhibit no aspect ratio distortion. The distortion is generally implemented as an asymmetric compression. The compression factors will depend upon the relative display format ratios of the auxiliary video signal and the wide screen television apparatus. In order to display an auxiliary video signal having a 4:3 display format ratio on a television apparatus having a 16:9 format display ratio. The auxiliary picture will be horizontally compressed by a factor of 4:1 and vertically compressed by a factor of 3:1. In a television apparatus having a different display format ratio, for example 2:1, the horizontal compression factor would be 1.5 times greater than the vertical compression factor. The asymmetric compression produces geometrically distorted pictures which can then be stored in a video memory associated with a picture-in-picture processor. When the asymmetrically compressed auxiliary picture is read out of memory, in accordance with the normal operation the picture-in-picture processor, the resulting auxiliary display exhibits no aspect ratio distortion and is proper size for its intended purpose, whether PIP, POP, channel scan or otherwise. The horizontal expansion realized by scanning in the wider television tube exactly cancels the extra compression, that is the asymmetric part, done prior to storage in the video memory.

A television apparatus, for example a wide screen television apparatus, according to this inventive arrangement comprises a video display having a first ratio of width to height. The video display can be, for example, a direct view picture tube or a projection picture tube used with a screen. A first turner or jack provides a first video signal, representing a first picture. A second tuner or jack provides a second video signal, representing a second picture having a second ratio of width to height different than the first format display ratio. A first signal processing circuit digitizes the second video signal and asymmetrically distorts the the second picture by horizontally and vertically subsampling the digitized signal at different rates. A video memory stores the lines of subsampled video of the asymmetrically distorted picture prior to the combination with the line portions of the first video signal. A second signal processing circuit combines portions of lines of video in the first video signal with lines of video of the asymmetrically compressed second picture for simultaneous display of the first and second pictures, the asymmetrically distorted second picture being displayed without aspect ratio distortion.

It is another inventive arrangement to provide a picture-in-picture processor which can provide selectable factors of horizontal and vertical compression for auxiliary video signals. Such a picture-in-picture processor can be used with television apparatus having different display format ratios, and with television apparatus which may have modes of operation which do not necessarily utilize the entire extent of a wide screen. Asymmetric compression in accordance with this aspect of the invention can be fully implemented on a chip, and can be implemented by modifying existing picture-in-picture processing chips.

A video signal processor for a video display apparatus, for example a wide screen television apparatus, according to this inventive arrangement comprises a circuit for digitizing a video signal defining a picture having a format display ratio of width to height and a circuit for selectively changing the width and height of the picture by first and second factors respectively to control aspect ratio distortion of the picture. The selective changing circuit horizontally and vertically subsamples the digitized video signal at the first and second rates respectively. An output circuit generates the aspect ratio controlled picture as an output for display by the video display apparatus. A memory circuit stores video lines of the aspect ratio controlled picture prior to generation of the output. A multiplexing circuit combines portions of video lines in a second video signal with video lines of the aspect ratio controlled picture for simultaneous display of the pictures. The first and second factors are supplied to the selective changing circuit, for example by a microprocessor.

FIGS. 1(a)-1(i) are useful for explaining different display formats of a wide screen television.

FIGS. 7 and 8 are timing diagrams useful for explaining the generation of the display format shown in FIG. 1(d), using fully cropped signals.

FIG. 10, FIG. 11 and FIG. 12 are block diagrams of the decimation section of the timing and control section shown in FIG. 9.

FIG. 13 is a table of values used for controlling the decimation section shown in FIGS. 10-12.

FIGS. 16 and 17 are block diagrams of fully programmable, general purpose decimation circuits for controlling horizontal and vertical compression ratios respectively.

The various parts of FIG. 1 illustrate some, but not all of the various combinations of single and multiple picture display formats which can be implemented according to different inventive arrangements. Those selected for illustration are intended to facilitate the description of particular circuits comprising wide screen televisions according to the inventive arrangements. For purposes of convenience in illustration and discussion herein, a conventional display format ratio of width to height for a video source or signal is generally deemed to be 4×3, whereas a wide screen display format ratio of width to height for a video source or signal is generally deemed to be 16×9. The inventive arrangements are not limited by these definitions.

Figure 1C:
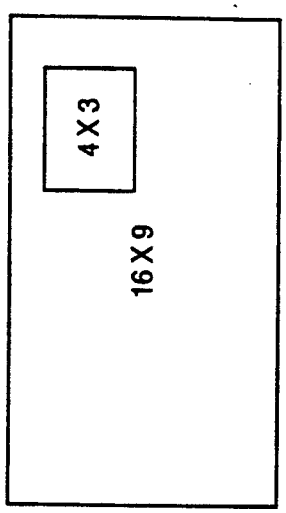
Figure 1F:
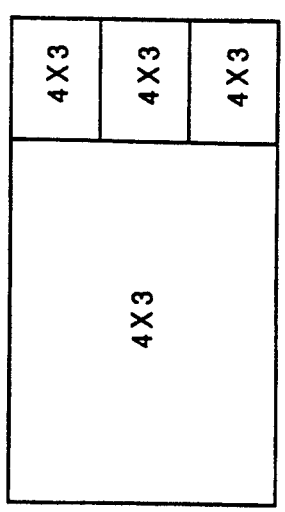
Figure 1I:
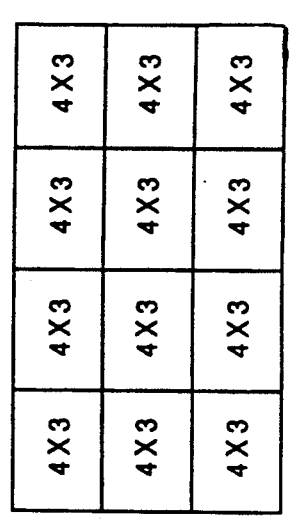
Figure 1B:
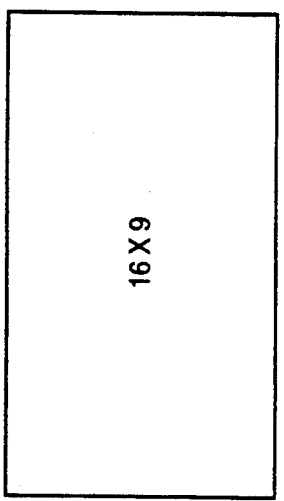
Figure 1E:
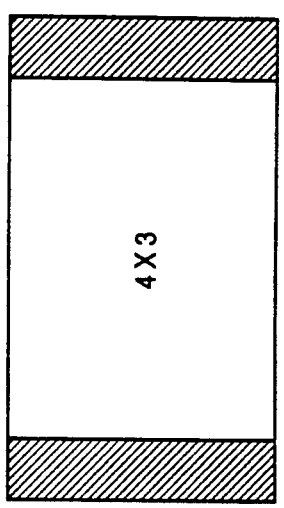
Figure 1H:
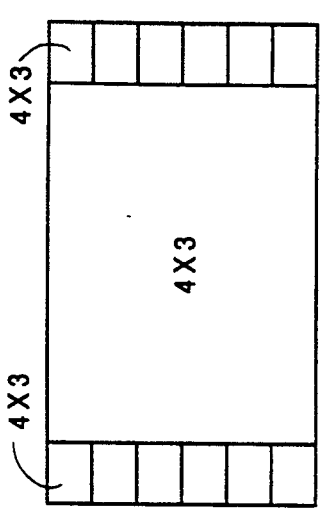
Figure 1A:
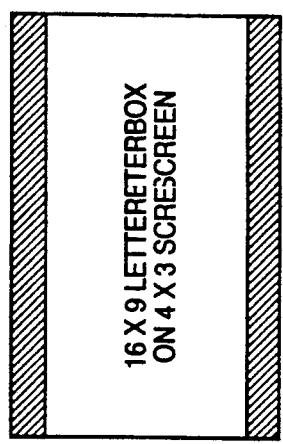

FIG. 1(a) illustrates a television, direct view or projection, having a conventional format display ratio of 4×3. When a 16×9 format display ratio picture is transmitted, as a 4×3 format display ratio signal, black bars appear at the top and at the bottom. This is commonly referred to as letterbox format. In this instance, the viewed picture is rather small with respect to the entire available display area. Alternatively, the 16×9 format display ratio source is converted prior to transmission, so that it will fill the vertical extent of a viewing surface of 4×3 format display. However, much information will be cropped from the left and/or right sides. As a further alternative, the letterbox picture can be expanded vertically but not horizontally, whereby the resulting picture will evidence distortion by vertical elongation. None of the three alternatives is particularly appealing.

FIG. 1(b) shows a 16×9 screen. A 16×9 format display ratio video source would be fully displayed, without cropping and without distortion. A 16×9 format display ratio letterbox picture, which is itself in a 4×3 format display ratio signal, can be progressively scanned by line doubling or line addition, so as to provide a larger display with sufficient vertical resolution. A wide screen television in accordance with this invention can display such a 16×9 format display ratio signal whether the main source, the auxiliary source or an external RGB source.

FIG. 1(c) illustrates a 16×9 format display ratio main signal in which a 4×3 format display ratio inset picture is displayed. If both the main and auxiliary video signals are 16×9 format display ratio sources, the inset picture can also have a 16×9 format display ratio. The inset picture can be displayed in many different positions.

Figure 1D:
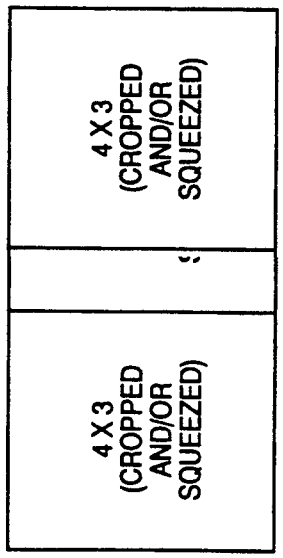

FIG. 1(d) illustrates a display format, wherein the main and auxiliary video signals are displayed with the same size picture. Each display area has an format display ratio of 8×9, which is of course different from both 16×9 and 4×3. In order to show a 4×3 format display ratio source in such a display area, without horizontal or vertical distortion, the signal must be cropped on the left and/or right sides. More of the picture can be shown, with less cropping, if some aspect ratio distortion by horizontal squeezing of the picture is tolerated. Horizontal squeezing results in vertical elongation of objects in the picture. The wide screen television according to this invention can provide any mix of cropping and aspect ratio distortion from maximum cropping with no aspect ratio distortion to no cropping with maximum aspect ratio distortion.

Data sampling limitations in the auxiliary video signal processing path complicate the generation of a high resolution picture which is as large in size as the display from the main video signal. Various methods can be developed for overcoming these complications.

FIG. 1(e) is a display format wherein a 4×3 format display ratio picture is displayed in the center of a 16×9 format display ratio screen. Dark bars are evident on the right and left sides.

Figure 1G:
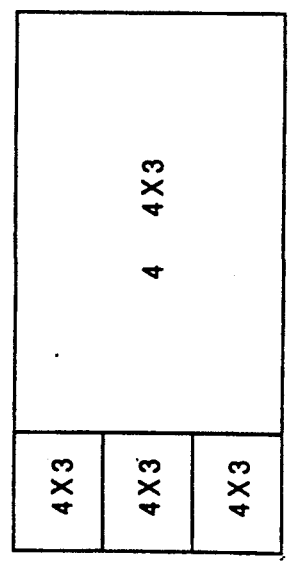

FIG. 1(f) illustrates a display format wherein one large 4×3 format display ratio picture and three smaller 4×3 format display ratio pictures are displayed simultaneously. A smaller picture outside the perimeter of the large picture is sometimes referred to as a POP, that is a picture-outside-picture, rather than a PIP, a picture-in-picture. The terms PIP or picture-in-picture are used herein for both display formats. In those circumstances where the wide screen television is provided with two tuners, either both internal or one internal and one external, for example in a video cassette recorder, two of the displayed pictures can display movement in real time in accordance with the source. The remaining pictures can be displayed in freeze frame format. It will be appreciated that the addition of further tuners and additional auxiliary signal processing paths can provide for more than two moving pictures. It will also be appreciated that the large picture on the one hand, and the three small pictures on the other hand, can be switched in position, as shown in FIG. 1(g).

FIG. 1(h) illustrates an alternative wherein the 4×3 format display ratio picture is centered, and six smaller 4×3 format display ratio pictures are displayed in vertical columns on either side. As in the previously described format, a wide screen television provided with two tuners can provide two moving pictures. The remaining eleven pictures will be in freeze frame format.

FIG. 1(i) shows a display format having a grid of twelve 4×3 format display ratio pictures. Such a display format is particularly appropriate for a channel selection guide, wherein each picture is at least a freeze frame from a different channel. As before, the number of moving pictures will depend upon the number of available tuners and signal processing paths.

The various formats shown in FIG. 1 are illustrative, and not limiting, and can be implemented by wide screen televisions shown in the remaining drawings and described in detail below.

Figure 2:
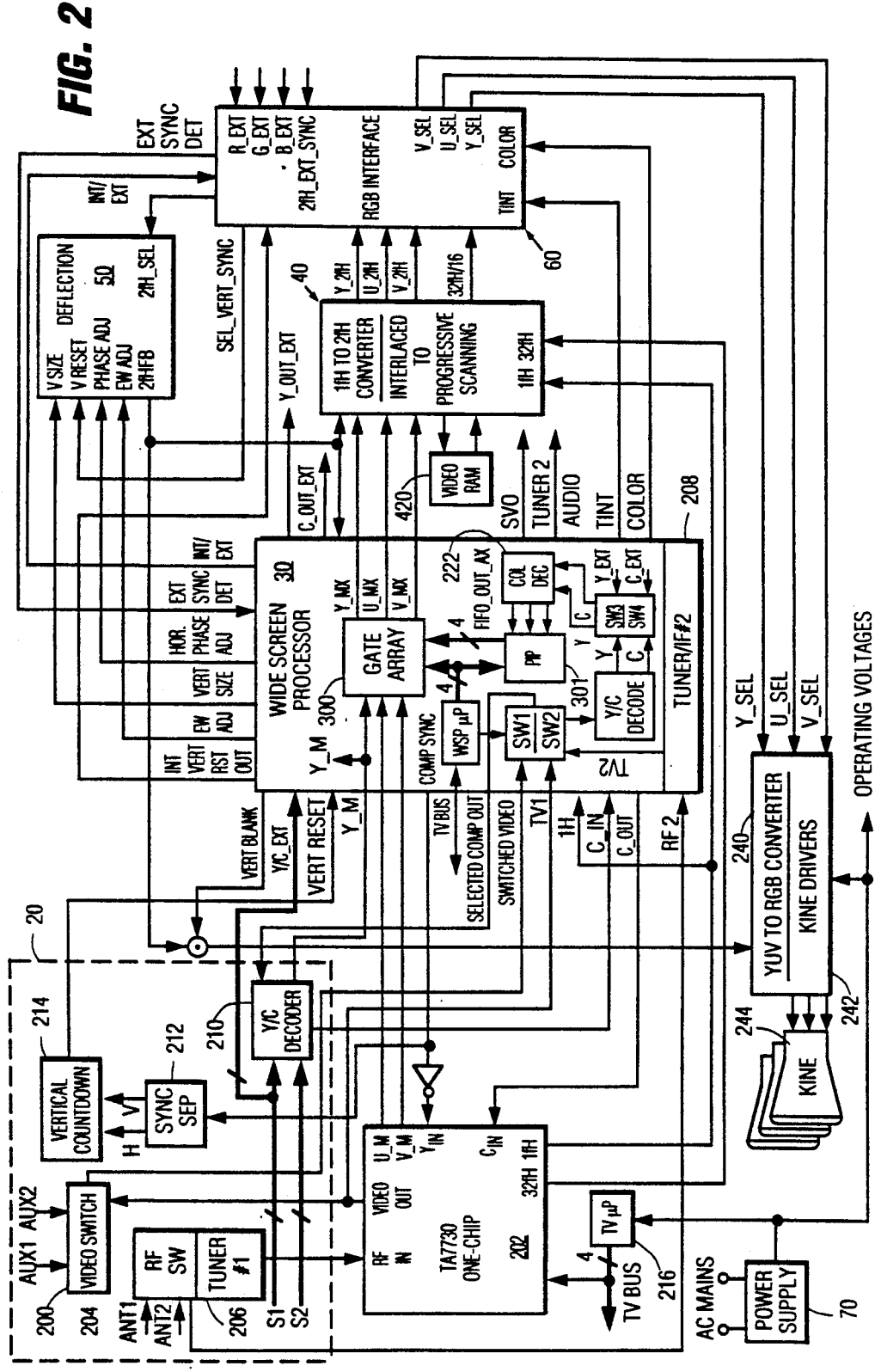
FIG. 2 is a block diagram of a wide screen television in accordance with aspects of this invention and adapted for operation at 2 $f_H$ horizontal scanning.

An overall block diagram for a wide screen television in accordance with inventive arrangements, and adapted to operate with 2 $f_H$ horizontal scanning, is shown in FIG. 2 and generally designated 10. The television 10 generally comprises a video signals input section 20, a chassis or TV microprocessor 216, a wide screen processor 30, a 1 $f_H$ to 2 $f_H$ converter 40, a deflection circuit 50, an RGB interface 60, a YUV to RGB converter 240, kine drivers 242, direct view or projection tubes 244 and a power supply 70. The grouping of various circuits into different functional blocks is made for purposes of convenience in description, and is not intended as limiting the physical position of such circuits relative to one another.

The video signals input section 20 is adapted for receiving a plurality of composite video signals from different video sources. The video signals may be selectively switched for display as main and auxiliary video signals. An RF switch 204 has two antenna inputs ANT1 and ANT 2. These represent inputs for both off-air antenna reception and cable reception. The RF switch 204 controls which antenna input is supplied to a first tuner 206 and to a second tuner 208. The output of first tuner 206 is an input to a one-chip 202, which performs a number of functions related to tuning, horizontal and vertical deflection and video controls. The particular one-chip shown is industry designated type TA7730. The baseband video signal VIDEO OUT developed in the one-chip and resulting from the signal from first tuner 206 is an input to both video switch 200 and the TV1 input of wide screen processor 30. Other baseband video inputs to video switch 200 are designated AUX1 and AUX 2. These might be used for video cameras, laser disc players, video tape players, video games and the like. The output of the video switch 200, which is controlled by the chassis or TV microprocessor 216 is designated SWITCHED VIDEO. The SWITCHED VIDEO is another input to wide screen processor 30.

Figure 3:
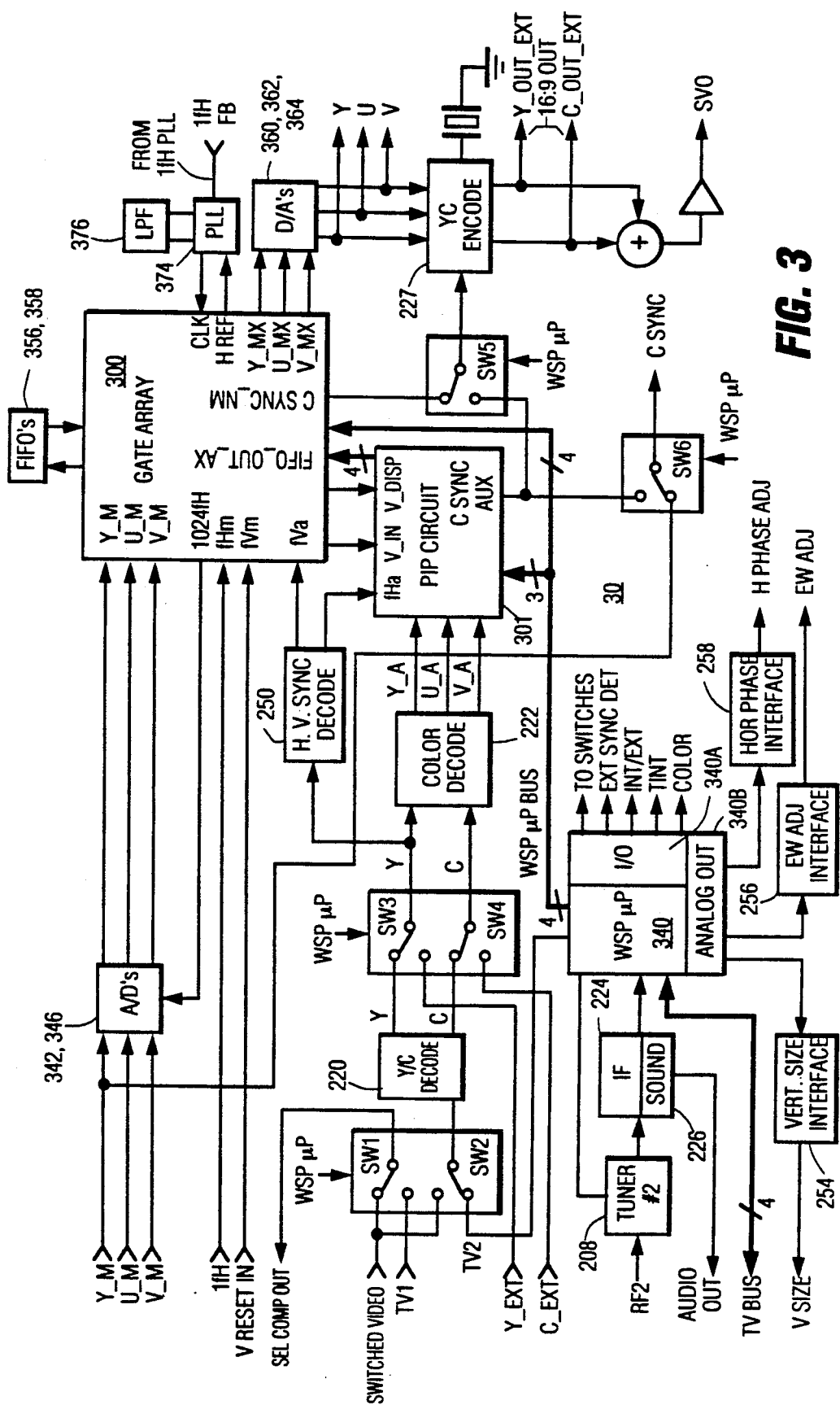
FIGS. 3 is a block diagram of the wide screen processor shown in FIG. 2.

With further reference to FIG. 3, a switch SW1 wide screen processor selects between the TV1 and SWITCHED VIDEO signals as a SEL COMP OUT video signal which is an input to a Y/C decoder 210. The Y/C decoder 210 may be implemented as an adaptive line comb filter. Two further video sources S1 and S2 are also inputs to the Y/C decoder 210. Each of S1 and S2 represents different S-VHS sources, and each consists of separate luminance and chrominance signals. A switch, which may be incorporated as part of the Y/C decoder, or which may be implemented as a separate switch, is responsive to the TV microprocessor 216 for selecting one pair of luminance and chrominance signals as outputs designated Y_M and C_IN respectively. The selected pair of luminance and chrominance signals is thereafter considered the main signal and is processed along a main signal path. Signal designations including _M or _MN refer to the main signal path. The chrominance signal C_IN is redirected by the wide screen processor back to the one-chip, for developing color difference signals U_M and V_M. In this regard, U is an equivalent designation for (R-Y) and V is an equivalent designation for (B-Y). The Y_M, U_M, and V_M signals are converted to digital form in the wide screen processor for further signal processing.

The second tuner 208, functionally defined as part of the wide screen processor 30, develops a baseband video signal TV2. A switch SW2 selects between the TV2 and SWITCHED VIDEO signals as an input to a Y/C decoder 220. The Y/C decoder 220 may be implemented as an adaptive line comb filter. Switches SW3 and SW4 select between the luminance and chrominance outputs of Y/C decoder 220 and the luminance and chrominance signals of an external video source, designated Y_EXT and C_EXT respectively. The Y_EXT and C_EXT signals correspond to the S-VHS input S1. The Y/C decoder 220 and switches SW3 and SW4 may be combined as in some adaptive line comb filters. The output of switches SW3 and SW4 is thereafter considered the auxiliary signal and is processed along an auxiliary signal path. The selected luminance output is designated Y_A. Signal designations including _A, _AX and _AUX refer to the auxiliary signal path. The selected chrominance is converted to color difference signals U_A and V_A. The Y_A, U_A and V_A signals are converted to digital form for further signal processing. The arrangement of video signal source switching in the main and auxiliary signal paths maximizes flexibility in managing the source selection for the different parts of the different picture display formats.

A composite synchronizing signal COMP SYNC, corresponding to Y_M is provided by the wide screen processor to a sync separator 212. The horizontal and vertical synchronizing components H and V respectively are inputs to a vertical countdown circuit 214. The vertical countdown circuit develops a VERTICAL RESET signal which is directed into the wide screen processor 30. The wide screen processor generates an internal vertical reset output signal INT VERT RST OUT directed to the RGB interface 60. A switch in the RGB interface 60 selects between the internal vertical reset output signal and the vertical synchronizing component of the external RGB source. The output of this switch is a selected vertical synchronizing component SEL_VERT_SYNC directed to the deflection circuit 50. Horizontal and vertical synchronizing signals of the auxiliary video signal are developed by sync separator 250 in the wide screen processor.

The 1 $f_H$ to 2 $f_H$ converter 40 is responsible for converting interlaced video signals to progressively scanned noninterlaced signals, for example one wherein each horizontal line is displayed twice, or an additional set of horizontal lines is generated by interpolating adjacent horizontal lines of the same field. In some instances, the use of a previous line or the use of an interpolated line will depend upon the level of movement which is detected between adjacent fields or frames. The converter circuit 40 operates in conjunction with a video RAM 420. The video RAM may be used to store one or more fields of a frame, to enable the progressive display. The converted video data as Y_2 $f_H$, U_2 $f_H$ and V_2 $f_H$ signals is supplied to the RGB interface 60.

Figure 15:
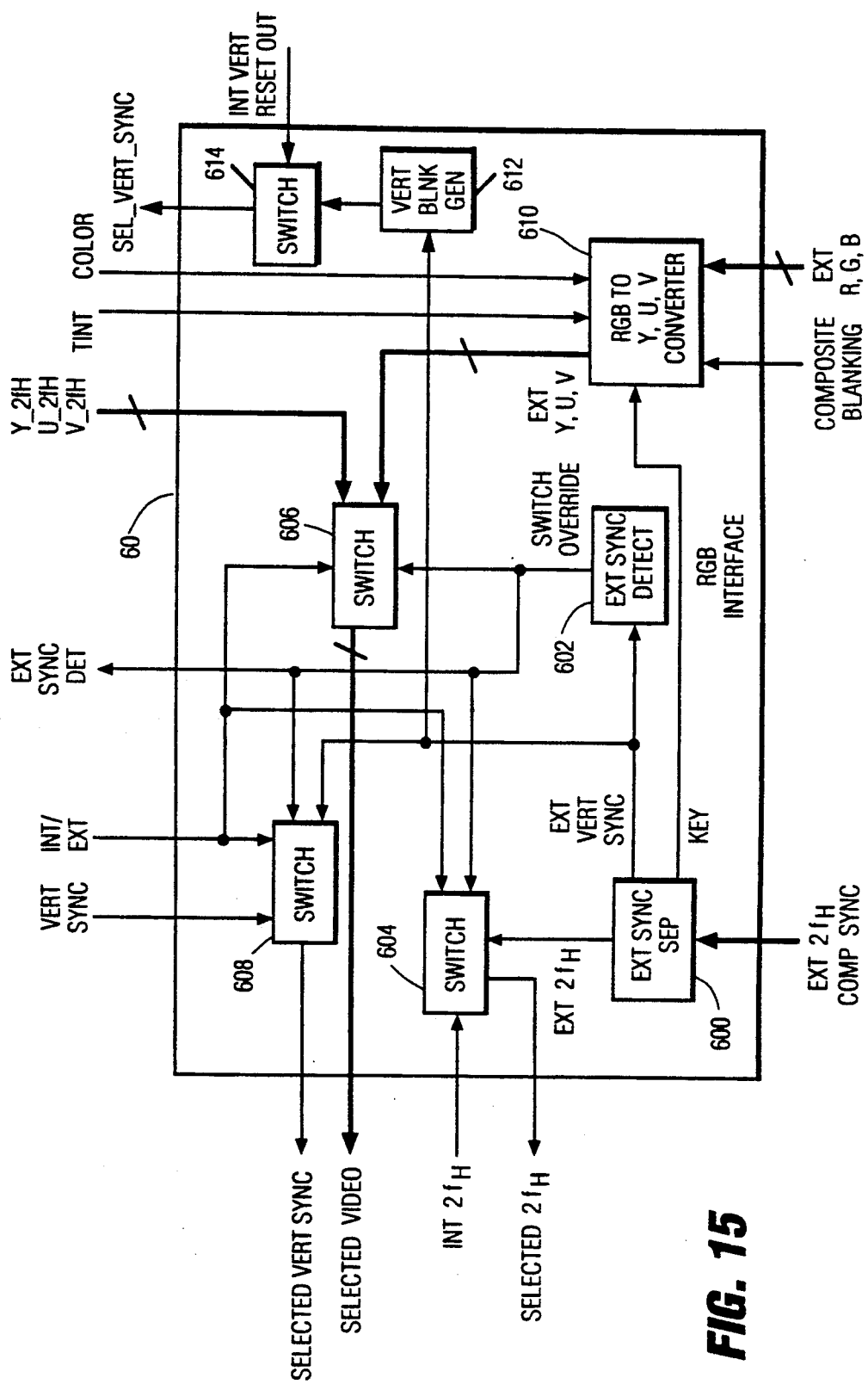
FIG. 15 is a block diagram of the RGB interface shown in FIG. 2.

The RGB interface 60, shown in more detail in FIG. 15, enables selection of the converted video data or external RGB video data for display by the video signals input section. The external RGB signal is deemed to be a wide format display ratio signal adapted for 2 $f_H$ scanning. The vertical synchronizing component of the main signal is supplied to the RGB interface by the wide screen processor as INT VERT RST OUT, enabling a selected vertical sync ($f_{Vm}$ or $f_{Vext}$) to be available to the deflection circuit 50. Operation of the wide screen television enables user selection of an external RGB signal, by generating an internal/external control signal INT/EXT. However, the selection of an external RGB signal input, in the absence of such a signal, can result in vertical collapse of the raster, and damage to the cathode ray tube or projection tubes. Accordingly, the RGB interface circuit detects an external synchronizing signal, in order to override the selection of a non-existent external RGB input. The WSP microprocessor 340 also supplies color and tint controls for the external RGB signal.

The wide screen processor 30 comprises a picture in picture processor 320 for special signal processing of the auxiliary video signal. The term picture-in-picture is sometimes abbreviated as PIP or pix-in-pix. A gate array 300 combines the main and auxiliary video signal data in a wide variety of display formats, as shown by the examples of FIGS. 1(b) through 1(i). The picture-in-picture circuit 320 and gate array 300 are under the control of a wide screen microprocessor (WSP μP) 340. Microprocessor 340 is responsive to the TV microprocessor 216 over a serial bus. The serial bus includes four signal lines, for data, clock signals, enable signals and reset signals. The wide screen processor 30 also generates a composite vertical blanking/reset signal, as a three level sandcastle signal. Alternatively, the vertical blanking and reset signals can be generated as separate signals. A composite blanking signal is supplied by the video signal input section to the RGB interface.

Figure 14:
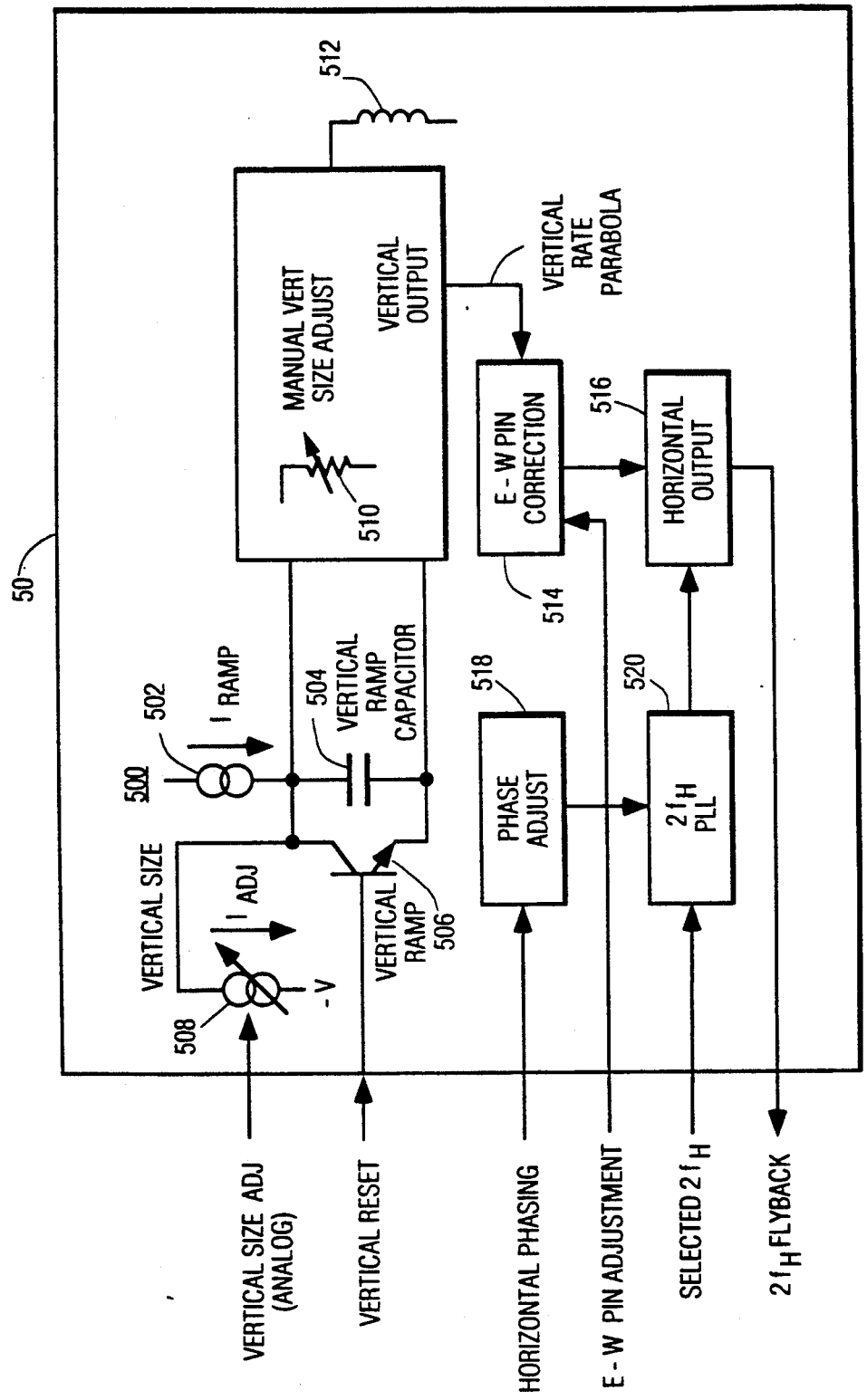
FIG. 14 is a combination block and circuit diagram for the deflection circuit shown in FIG. 2.

The deflection circuit 50, shown in more detail in FIG. 14, receives a vertical reset signal from the wide screen processor, a selected 2 $f_H$ horizontal synchronizing signal from the RGB interface 60 and additional control signals from the wide screen processor. These additional control signals relate to horizontal phasing, vertical size adjustment and east-west pin adjustment.

The deflection circuit 50 supplies 2 $f_H$ flyback pulses to the wide screen processor 30, the 1 $f_H$ to 2 $f_H$ converter 40 and the YUV to RGB converter 240.

Operating voltages for the entire wide screen television are generated by a power supply 70 which can be energized by an AC mains supply.

Figure 4:
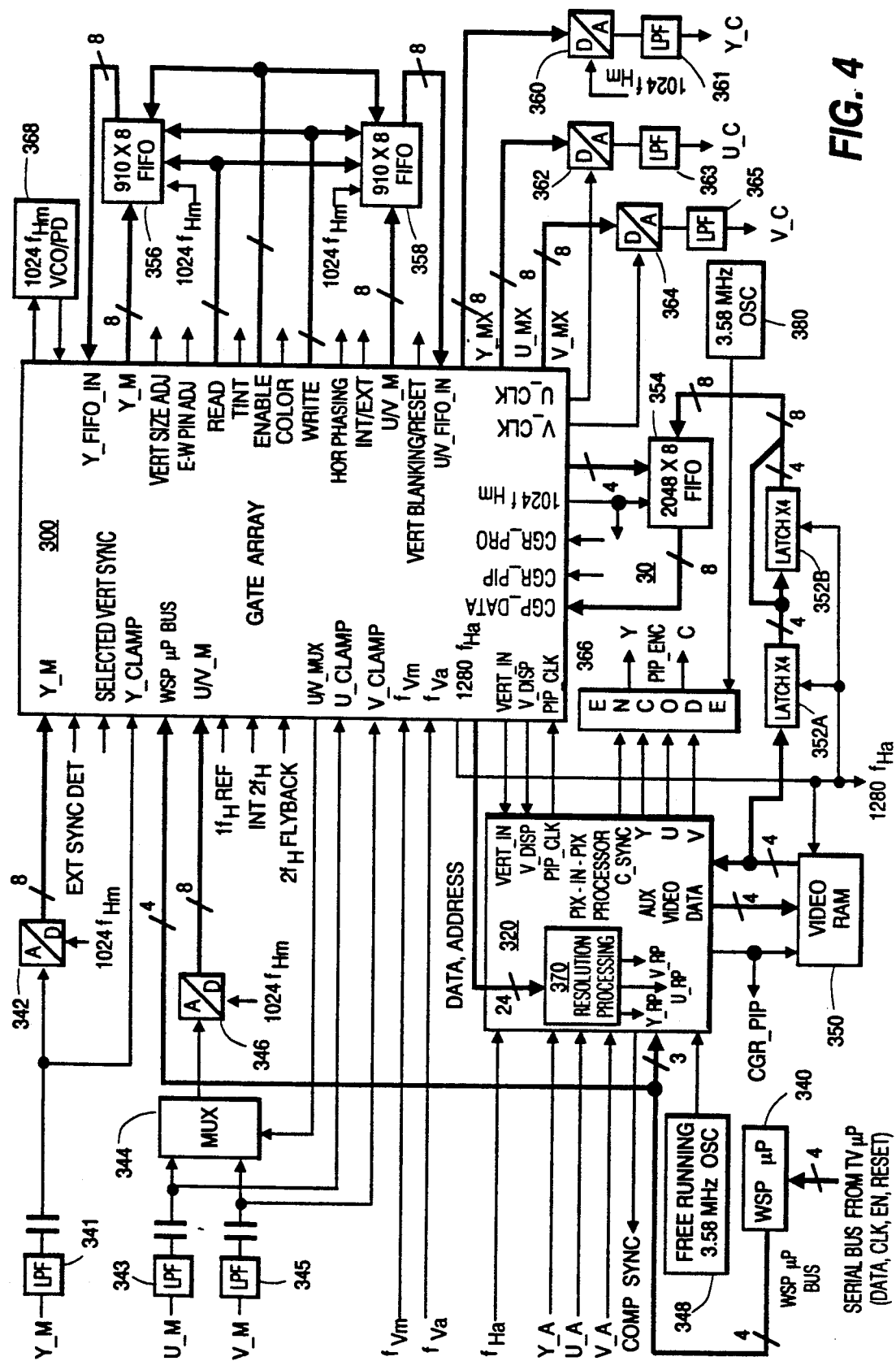
FIG. 4 is a block diagram showing further details of the wide screen processor shown in FIG. 3.

The wide screen processor 30 is shown in more detail in FIG. 3. The principal components of the wide screen processor are a gate array 300, a picture-in-picture circuit 301, analog to digital and digital to analog converters, the second tuner 208, a wide screen processor microprocessor 340 and a wide screen output encoder 227. Further details of the wide screen processor, which are in common with both the 1 $f_H$ and the 2 $f_H$ chassis, for example the PIP circuit, are shown in FIG. 4. A picture-in-picture processor 320, which forms a significant part of the PIP circuit 301, is shown in more detail in FIG. 5. The gate array 300 is shown in more detail in FIG. 6. A number of the components shown in FIG. 3, forming parts of the main and auxiliary signal paths, have already been described in detail.

The second tuner 208 has associated therewith an IF stage 224 and an audio stage 226. The second tuner 208 also operates in conjunction with the WSP $\mu$P 340. The WSP $\mu$P 340 comprises an input output I/O section 340A and an analog output section 340B. The I/O section 340A provides tint and color control signals, the INT/EXT signal for selecting the external RGB video source and control signals for the switches SW1 through SW6. The I/O section also monitors the EXT SYNC DET signal from the RGB interface to protect the deflection circuit and cathode ray tube(s). The analog output section 340B provides control signals for vertical size, east-west adjust and horizontal phase, through respective interface circuits 254, 256 and 258.

The gate array 300 is responsible for combining video information from the main and auxiliary signal paths to implement a composite wide screen display, for example one of those shown in the different parts of FIG. 1. Clock information for the gate array is provided by phase locked loop 374, which operates in conjunction with low pass filter 376. The main video signal is supplied to the wide screen processor in analog form, and Y U V format, as signals designated Y_M, U_M and V_M. These main signals are converted from analog to digital form by analog to digital converters 342 and 346, shown in more detail in FIG. 4.

The color component signals are referred to by the generic designations U and V, which may be assigned to either R-Y or B-Y signals, or I and Q signals. The sampled luminance bandwidth is limited to 8 MHz because the system clock rate is 1024 $f_H$, which is approximately 16 MHz. A single analog to digital converter and an analog switch can be used to sample the color component data because the U and V signals are limited to 500 KHz, or 1.5 MHz for wide I. The select line UV_MUX for the analog switch, or multiplexer 344, is an 8 MHz signal derived by dividing the system clock by 2. A one clock wide start of line SOL pulse synchronously resets this signal to zero at the beginning of each horizontal video line. The UV_MUX line than toggles in state each clock cycle through the horizontal line. Since the line length is an even number of clock cycles, the state of the UV_MUX, once initialized, will consistently toggle 0, 1, 0, 1, . . . , without interruption. The Y and UV data streams out of the analog to digital converters 342 and 346 are shifted because the analog to digital converters each have 1 clock cycle of delay. In order to accommodate for this data shift, the clock gating information from the main signal processing path 304 must be similarly delayed. Were the clock gating information not delayed, the UV data will not be correctly paired when deleted. This is important because each UV pair represents one vector. A U element from one vector cannot be paired with a V element from another vector without causing a color shift. Instead, a V sample from a previous pair will be deleted along with the current U sample. This method of UV multiplexing is referred to as 2:1:1, as there are two luminance samples for every pair of color component (U, V) samples. The Nyquist frequency for both U and V is effectively reduced to one half of the luminance Nyquist frequency. Accordingly, the Nyquist frequency of the output of the analog to digital converter for the luminance component is 8 MHz, whereas the Nyquist frequency of the output of the analog to digital converter for the color components is 4 MHz.

The PIP circuit and/or the gate array may also include means for enhancing the resolution of the auxiliary data notwithstanding the data compression. A number of data reduction and data restoration schemes have been developed, including for example paired pixel compression and dithering and dedithering. Moreover, different dithering sequences involving different numbers of bits and different paired pixel compressions involving different numbers of bits are contemplated. One of a number of particular data reduction and restoration schemes can be selected by the WSP $\mu$P 340 in order to maximize resolution of the displayed video for each particular kind of picture display format.

The gate array includes interpolators which operate in conjunction with line memories, which may be implemented as FIFO's 356 and 358. The interpolator and FIFO's are utilized to resample the main signal as desired. An additional interpolator can resample the auxiliary signal. Clock and synchronizing circuits in the gate array control the data manipulation of both the main and auxiliary signals, including the combination thereof into a single output video signal having Y_MX, U_MX and V_MX components. These output components are converted to analog form by digital to analog converters 360, 362 and 364. The analog form signals, designated Y, U and V, are supplied to the 1 $f_H$ to 2 $f_H$ converter 40 for conversion to noninterlaced scanning. The Y, U and V signals are also encoded to Y/C format by encoder 227 to define a wide format ratio output signal Y_OUT_EXT/C_OUT_EXT available at panel jacks. Switch SW5 selects a synchronizing signal for the encoder 227 from either the gate array, C_SYNC_MN, or from the PIP circuit, C_SYNC_AUX. Switch SW6 selects between Y_M and C_SYNC_AUX as synchronizing signal for the wide screen panel output.

It can be desirable to display otherwise interlaced video signals in a progressively scanned format to improve resolution of the display. Such conversion can be undertaken according to prior art techniques for conventional 4×3 format display ratio displays. With reference again to FIG. 2, the wide screen television 10 is provided with a 1 $f_H$ to a 2 $f_H$ converter 40, for generating the timing signals necessary to convert an interlaced NTSC display into a progressively scanned display. In a progressively scanned display, for example, a video RAM 420 is used for storing successive fields, so that lines from successive fields can be displayed successively in time, or be interpolated to form new lines.

The deflection circuit 50 is shown in more detail in FIG. 14. A circuit 500 is provided for adjusting the vertical size of the raster, in accordance with a desired amount of vertical overscan necessary for implementing different display formats. As illustrated diagrammatically, a constant current source 502 provides a constant quantity of current $I_{RAMP}$ which charges a vertical ramp capacitor 504. A transistor 506 is coupled in parallel with the vertical ramp capacitor, and periodically discharges the capacitor responsive to the vertical reset signal. In the absence of any adjustment, current $I_{RAMP}$ provides the maximum available vertical size for the raster. This might correspond to the extent of vertical overscan needed to fill the wide screen display by an expanded 4×3 format display ratio signal source, as shown in FIG. 1(a). To the extent that less vertical raster size is required, an adjustable current source 508 diverts a variable amount of current $I_{ADJ}$ from $I_{RAMP}$, so that vertical ramp capacitor 504 source more slowly and to a smaller peak value. Variable current source 508 is responsive to a vertical size adjust signal, for example in analog form, generated by a vertical size control circuit. Vertical size adjustment 500 is independent of a manual vertical size adjustment 510, which may be implemented by a potentiometer or back panel adjustment knob. In either event, the vertical deflection coil(s) 512 receive(s) driving current of the proper magnitude for mapping the picture onto the display. Horizontal deflection is provided by phase adjusting circuit 518, East-West pin correction circuit 514, a 2 $f_H$ phase locked loop 520 and horizontal output circuit 516.

The RGB interface circuit 60 is shown in more detailed in FIG. 15. The signal which is to be ultimately displayed will be selected between the output of the 1 $f_H$ to 2 $f_H$ converter 40 and an external RGB input. For purposes of the wide screen television described herein, the external RGB input is presumed to be a wide format display ratio, progressively scanned source. The external RGB signals and a composite blanking signal from the video signals input section 20 are inputs to an RGB to Y U V converter 610. The external 2 $f_H$ composite synchronizing signal for the external RGB signal is an input to external synchronizing signal separator 600. Selection of the vertical synchronizing signal is implemented by switch 608. Selection of the horizontal synchronizing signal is implemented by switch 604. Selection of the video signal is implemented by switch 606. Each of the switches 604, 606 and 608 is responsive to an internal/external control signal generated by the WSP µP 340. Selection of internal or external video sources is a user selection. However, if a user inadvertently selects an external RGB source, when no such source is connected or turned on, or if the external source drops out, the vertical raster will collapse, and serious damage to the cathode ray tube(s) can result. Accordingly, an external synchronizing detector 602 checks for the presence of an external synchronizing signal. In the absence of such a signal, a switch override control signal is transmitted to each of switches 604, 606 and 608, to prevent selection of the external RGB source if the signal therefrom is not present. The RGB to YUV converter 610 also receives tint and color control signals from the WSP µP 340.

A wide screen television in accordance with the inventive arrangements can be implemented with 1 $f_H$ horizontal scanning instead of 2 $f_H$ horizontal scanning, although such a circuit is not illustrated. A 1 $f_H$ circuit would not require the 1 $f_H$ to 2 $f_H$ converter and the RGB interface. Accordingly, there would be no provision for displaying an external wide format display ratio RGB signal at a 2 $f_H$ scanning rate. The wide screen processor and picture-in-picture processor for a 1 $f_H$ circuit would be very similar. The gate array could be substantially identical, although not all of the inputs and outputs would be utilized. The various resolution enhancement schemes described herein can be generally applied without regard to whether the television operates with 1 $f_H$ or 2 $f_H$ scanning.

FIG. 4 is a block diagram showing further details of the wide screen processor 30 shown in FIG. 3 which would be the same for both a 1 $f_H$ and 2 $f_H$ chassis. The Y_A, U_A and V_A signals are an input to the picture in picture processor 320, which can include a resolution processing circuit 370. The wide screen television according to aspects of this invention can expand and compress video. The special effects embodied by the various composite display formats illustrated in part in FIG. 1 are generated by the picture-in-picture processor 320, which can receive resolution processed data signals Y_RP, U_RP and V_RP from resolution processing circuit 370. Resolution processing need not be utilized at all times, but during selected display formats. The picture-in-picture processor 320 is shown in more detail in FIG. 5. The principal components of the picture-in-picture processor are an analog-to-digital-converter section 322, an input section 324, a fast switch (FSW) and bus section 326, a timing and control section 328 and a digital-to-analog converter section 330. The timing and control section 328 is shown in more detail in FIG. 9.

The picture-in-picture processor 320 may be embodied as an improved variation of a basic CPIP chip developed by Thomson Consumer Electronics, Inc. A number of special features or special effects are possible, the following being illustrative. The basic special effect is a large picture having a small picture overlaying a portion thereof as shown in FIG. 1(c). It will be appreciated that the basic CPIP chip was not adapted for use with a wide screen television and is not appropriate for use with a wide screen television. The large and small pictures can result from the same video signal, from different video signals and can be interchanged or swapped. Generally speaking, the audio signal is switched to always correspond to the big picture. The small picture can be moved to any position on the screen or can step through a number of predetermined positions. A zoom feature increases and decreases the size of the small picture, for example to any one of a number of preset sizes. At some point, for example the display format shown in FIG. 1(d), the large and small pictures are in fact the same size.

In a single picture mode, for example that shown in FIGS. 1(b), 1(e) or 1(f) a user can zoom in on the content of the single picture, for example, in steps from a ratio of 1.0:1 to 5.0:1. While in the zoom mode a user may search or pan through the picture content enabling the screen image to move across different areas of the picture. In either event, either the small picture or the large picture or the zoomed picture can be displayed in freeze frame (still picture format). This function enables a strobe format, wherein the last nine frames of video can be repeated on the screen. The frame repetition rate can be changed from thirty frames per second to zero frames per second.

The picture-in-picture processor used in the wide screen television according to another inventive arrangement differs from the present configuration of the basic CPIP chip described above. If the basic CPIP chip were used with a television having a 16×9 screen, and without a video speed up circuit, the inset pictures would exhibit aspect ratio distortion, due to the effective 4/3 times horizontal expansion resulting from scanning across the wider 16×9 screen. Objects in the picture would be horizontally elongated. If an external speed up circuit were utilized, there would be no aspect ratio distortion, but the picture would not fill the entire screen.

The picture-in-picture processor 320, according to an inventive arrangement and unlike the basic CPIP chip, is adapted for asymmetrically compressing the video data in one of a plurality of selectable display modes. Compression of the horizonal dimension is different from the compression of the vertical dimension. In one example of this mode of operation, the pictures are compressed 4:1 horizontally and 3:1 vertically. The asymmetrically compressed video data is stored in a video RAM, which serves as a field memory used, in part, for synchronizing the auxiliary signal to the main signal. This asymmetric mode of compression would produce aspect ratio distorted pictures if the data from the video RAM were read normally for display by a conventional television. Objects in the pictures would appear to be squeezed horizontally. However, if this data is read out normally for display by a wide screen television, particularly one with a 16×9 format display ratio screen, objects in the pictures appear correct. The picture fills the screen and there is no image aspect ratio distortion. The asymmetric compression mode according to this aspect of the invention makes it possible to generate special display formats on a 16×9 screen without external speed up circuitry.

Figure 9:
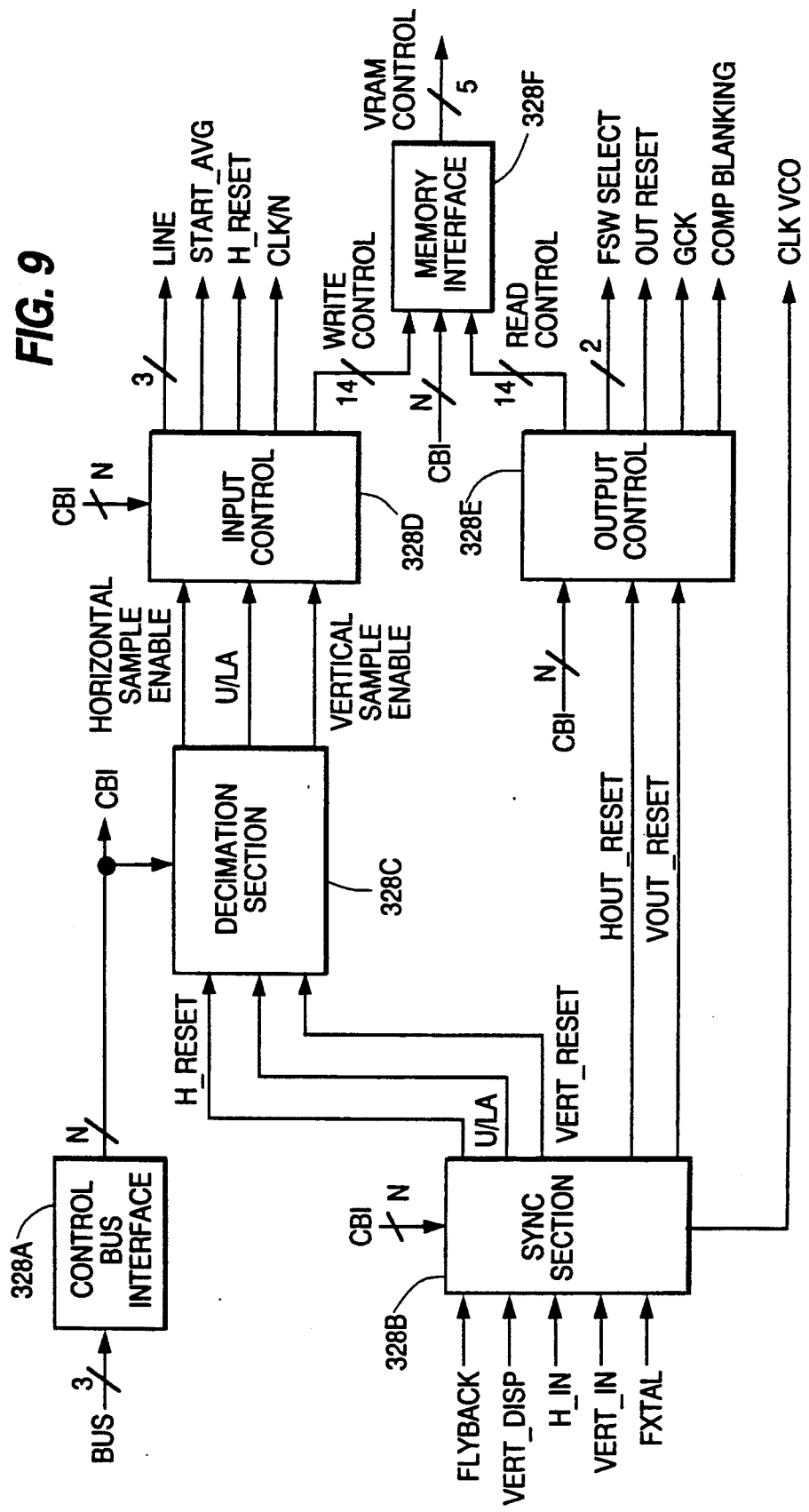
FIG. 9 is a block diagram of the timing and control section of the picture-in-picture processor of FIG. 5.

FIG. 9 is a block diagram of the timing and control section 328 of the picture-in-picture processor, for example a modified version of the CPIP chip described above, which includes a decimation circuit 328C for implementing the asymmetric compression. The decimation circuit 328C is shown more fully in FIGS. 10–12.

FIG. 10 is a block diagram of the circuit for implementing the horizontal compression. The circuit utilizes a decimation circuit formed by a counter 850, designated MOD_N_CNTR1. The numerical value at the N input is a horizontal N factor HOR_N_FACTOR. The horizontal N factor is related to the extent to which the picture represented by the video data of the auxiliary signal will be reduced in size for display as a PIP or POP, and accordingly, is also a measure of the rate at which pixels within a line are subsampled. The numerical input to the load value input is set to "0". The ripple carry out RCO output is a horizontal line sample enable signal. FIG. 11 is a block diagram of the circuit for implementing the vertical compression. This circuit is based on a decimation circuit formed by a counter 858 designated MOD_N_CNTR2. The numerical value at the N input is a vertical N factor VERT_N_FACTOR. The vertical N factor is also related to the extent to which the picture represented by the video data of the auxiliary signal will be reduced in size for display as a PIP or POP, but in this case, is a measure of how many horizontal lines are selected for subsampling. The numerical input to the load value input is determined by a numerical calculation based on the vertical N factor. The vertical N factor is added to "2", the resulting sum is divided by "2", and the result of the division is gated by an upper/lower field type signal U/L_FIELD_TYPE. added to "2". The output of the counter 858 is a vertical line sample enable signal.

The horizontal and vertical N factors are generated by a circuit 859 shown in FIG. 12. The input is an N_FACTOR value ranging from "0" through "7". Each N value corresponds to pairs of horizontal and vertical compression ratios, as shown in the table of FIG. 13. The N factors are provided by the WSP μP 340. Circuit 859 comprises multiplexers 862 and 864 and a compare to "6" circuit 860. For each N factor other than "6", the horizontal and vertical compression ratios are symmetric, resulting from the "0" inputs of the multiplexers. When the N factor is "6", the "1" inputs of the multiplexers are gated as the outputs. These inputs result in the asymmetric compression of 4:1 horizontally and 3:1 vertically.

The counters in the decimation circuits function are shown as integral number decimators. However, the processing does not have to be limited to compression of the images in integer increments, provided that the horizontal compression factor is 4/3 times the vertical compression factor. Asymmetric compression is also not limited to wide screen applications having a display format ratio of 16×9. If the format display ratio were to be 2:1, for example, the horizontal compression factor would be 3/2 times the vertical compression factor.

The wide screen television can also have modes of operation which requires symmetric compression of the auxiliary video data by the CPIP chip. One such mode of operation can be referred to as the letterbox mode, wherein the vertical deflection height is increased to accommodate a video source such as shown in FIG. 1(a). The vertical scan amounts to approximately 4/3 that of the standard or nominal vertical height, for a 4×3 letterbox source of a 16×9 movie. Therefore, approximately ⅓ of the picture is effectively cropped, approximately 1/6 on the top and 1/6 on the bottom, if the raster is vertically centered. The dark border bars of a letterbox signal, in 4×3 display format ratio, comprise approximately ⅓ of the picture, approximately 1/6 on the top and 1/6 on the bottom. At the same time, the wider horizontal deflection required by the wide screen display stretches the picture horizontally, by a factor of approximately 4/3. The wide screen display stretches the picture horizontally by approximately the same factor that the 4/3 vertical overscan stretches the picture vertically. The substantially symmetric expansion of the picture assures that substantially no image aspect ratio distortion will occur. At the same time, the parts of the picture which are cropped by the vertical overscan prove to substantially correspond to the dark border bars of the letterbox signal. The result is a picture from a conventional format display ratio signal filling a wide format display ratio screen, essentially without loss of picture content and essentially without image aspect ratio distortion. In this circumstance, PIPs or POPs can be processed with symmetric compression by the CPIP chip because the vertical expansion by vertical overscanning matches the horizontal expansion by the wide screen horizontal deflection scanning in proportion.

Control of the compression ratios can also be implemented by fully programmable, general purpose decimation circuits under the control of the WSP μP 340, as shown in FIGS. 16 and 17. Horizontal compression factors are generated by the circuit in FIG. 16, which comprises a summing junction 866, an array 868 of eight OR gates and a latch 870. Each bit of the eight bit output of the array 868 is HI when the H_RESET occurs. When the H_RESET signal is low, the output of the array 868 equals the input of the array, which is the output of summing junction 866. Vertical compression factors are generated by the circuit in FIG. 17, which comprises a summing junction 872, a multiplexer 874 and a latch 876. In each circuit, the carry in CI input of the summing circuit is tied to a voltage for a fixed logical high signal. In each circuit, the carry out CO output of the summing circuit is the respective sample enable signal. In the circuit of FIG. 17, the 1 input to the multiplexer is tied to ground for a fixed logical low signal. The horizontal and vertical compression factors can be supplied by the WSP μP 340.

In full screen PIP modes, the picture-in-picture processor, in conjunction with a free running oscillator 348 will take Y/C input from a decoder, for example an adaptive line comb filter, decode the signal into Y, U, V color components and generate horizontal and vertical synchronizing pulses. These signals are processed in the picture-in-picture processor for the various full screen modes such as zoom, freeze and channel scan. During the channel scan mode, for example, the horizontal and vertical synchronizing pulses present from the video signals input section will have many discontinuities because the signals sampled (different channels) will have unrelated synchronizing pulses and will be switched without regard to synchronization between sources. Therefore, the sample clock and the read/write video RAM clock are determined by the free running oscillator 348. For freeze and zoom modes, the sample clock will be locked to the horizontal synchronizing pulses of the incoming video, which in these special cases is the same as the display clock frequency.

Referring again to FIG. 4, Y, U, V and $C_{13}SYNC$ (composite sync) outputs from the picture-in-picture processor in analog form can be re-encoded into Y/C components by encode circuit 366, which operates in conjunction with a 3.58 MHz oscillator 380. This Y/C_PIP_ENC signal may be connected to a Y/C switch, not shown, which enables the re-encoded Y/C components to be substituted for the Y/C components of the main signal. From this point on, the PIP encoded Y, U, V and sync signals would be the basis for horizontal and vertical timing in the rest of the chassis. This mode of operation is appropriate for implementing a zoom mode for the PIP, based upon operation of the interpolator and FIFO's in the main signal path.

Figure 5:
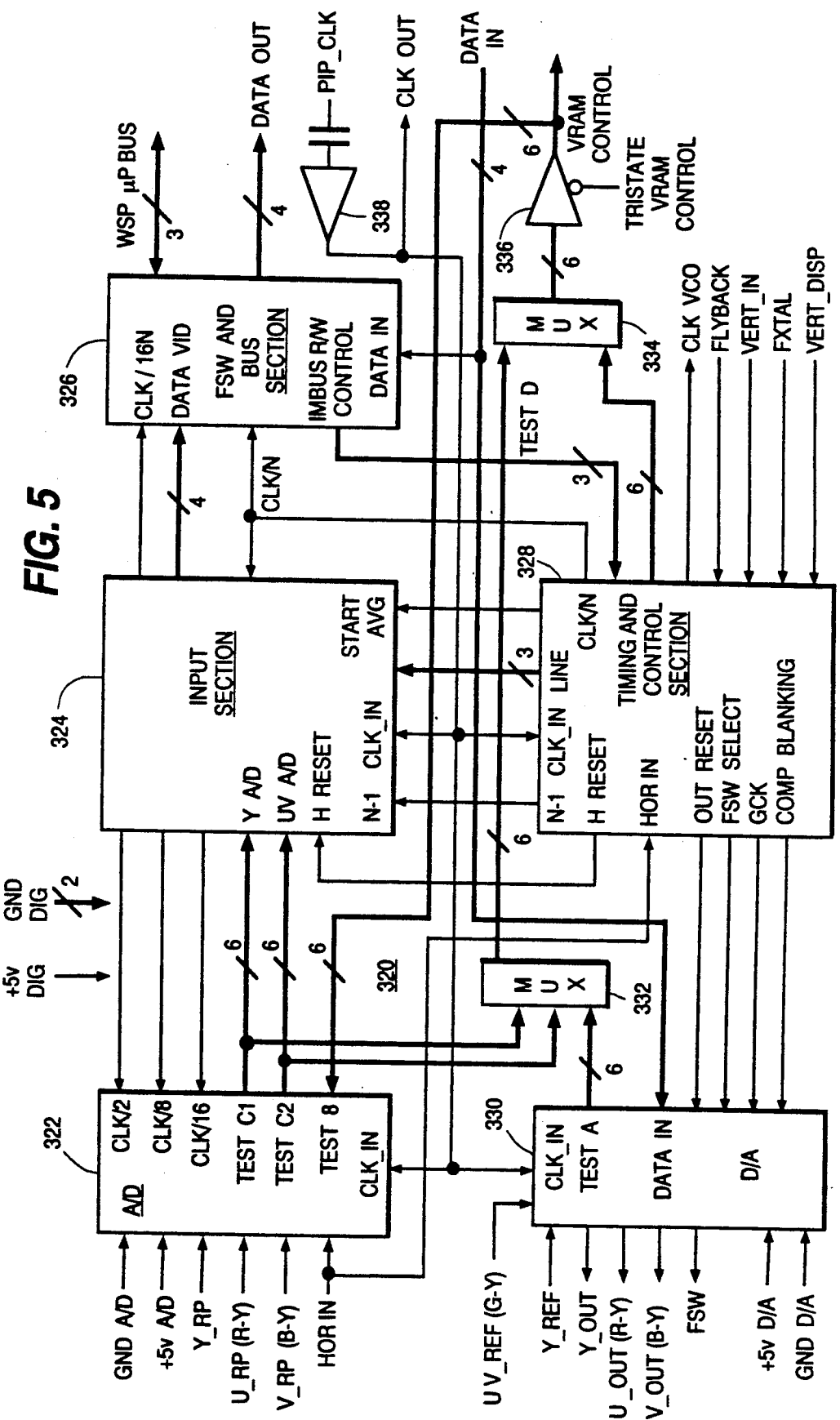
FIG. 5 is a block diagram of the picture-in-picture processor shown in FIG. 4.

With further reference to FIG. 5, the picture-in-picture processor 320 comprises analog to digital converting section 322, input section 324, fast switch FSW and bus control section 326, timing and control section 328 and digital to analog converting section 330. In general, the picture-in-picture processor 320 digitizes the video signal into luminance (Y) and color difference signals (U, V), subsampling and storing the results in a 1 megabit video RAM 350 as explained above. The video RAM 350 associated with the picture-in-picture processor 320 has a memory capacity of 1 megabit, which is not large enough to store a full field of video data with 8-bit samples. Increased memory capacity tends to be expensive and can require more complex management circuitry. The smaller number of bits per sample in the auxiliary channel represents a reduction in quantization resolution, or bandwidth, relative to the main signal, which is processed with 8-bit samples throughout. This effective reduction of bandwidth is not usually a problem when the auxiliary displayed picture is relatively small, but can be troublesome if the auxiliary displayed picture is larger, for example the same size as the main displayed picture. Resolution processing circuit 370 can selectively implement one or more schemes for enhancing the quantization resolution or effective bandwidth of the auxiliary video data. A number of data reduction and data restoration schemes have been developed, including for example, paired pixel compression and dithering and dedithering. A dedithering circuit would be operatively disposed downstream of the video RAM 350, for example in the auxiliary signal path of the gate array, as explained in more detail below. Moreover, different dithering and dedithering sequences involving different numbers of bits and different paired pixel compressions involving different number of bits are contemplated. One of a number of particular data reduction and restoration schemes can be selected by the WSP μP in order to maximize resolution of the displayed video of each particularly kind of picture display format.

The luminance and color difference signals are stored in an 8:1:1 six-bit Y, U, V fashion. In other words, each component is quantized into six-bit samples. There are eight luminance samples for every pair of color difference samples. The incoming video is sampled with a $640f_H$ clock which is locked to the horizontal synchronizing signal of the main video source. In other words, data stored in the video RAM 350 is not orthogonally sampled with respect to the incoming auxiliary video source. This is a fundamental limitation on the basic CPIP method of field synchronization. The nonorthogonal nature of the input sampling rate results in skew errors of the sampled data. The limitation is a result of the video RAM, which must use the same clock for writing and reading data. When data from the video RAM 350 is displayed, the skew errors are seen as random jitter along vertical edges of the picture and are generally considered quite objectionable.

In order to overcome this problem in accordance with inventive arrangements the picture-in-picture processor 320 is operated in a mode whereby incoming video data is sampled with a $640f_H$ clock rate locked to the incoming auxiliary video synchronizing signal instead. In this mode, data stored in the video RAM is orthogonally sampled. When the data is read out of the picture-in-picture processor video RAM 350, it is read using the same $640f_H$ clock locked to the incoming auxiliary video signal. However, even though this data was orthogonally sampled and stored, and can be read out orthogonally, it cannot be displayed orthogonally directly from the video RAM 350, due to the asynchronous nature of the main and auxiliary video sources. The main and auxiliary video source might be expected to be synchronous only in that instance where they are displaying signals from the same video source.

Further processing is required in order to synchronize the auxiliary channel, that is the output of data from the video RAM 350, to the main channel. With reference again to FIG. 4, two four bit latches 352A and 352B are used to recombine the 8-bit data blocks from the video RAM 4-bit output port. The four bit latches also reduce the data clock rate from $1280f_H$ to $640f_H$.

Generally, the video display and deflection system is synchronized with the main video signal. The main video signal must be speeded up, as explained above, to fill the wide screen display. The auxiliary video signal must be vertically synchronized with the first video signal and the video display. The auxiliary video signal can be delayed by a fraction of a field period in a field memory, and then expanded in a line memory. Synchronization of the auxiliary video data with main video data is accomplished by utilizing the video RAM 350 as a field memory and a first in first out (FIFO) line memory device 354 for expanding the signal. The size of FIFO 354 is 2048×8. The size of FIFO is related to the minimum line storage capacity thought to be reasonably necessary to avoid read/write pointer collisions. Read/write pointer collisions occur when old data is read out of the FIFO before new data has an opportunity to be written into the FIFO. Read/write pointer collisions also occur when new data overwrites the memory before the old data has an opportunity to be read out of the FIFO.

The 8-bit DATA_PIP data blocks from video RAM 350 are written into 2048×8 FIFO 354 with the same picture-in-picture processor $640f_H$ clock which was used to sample the video data, that is, the $640f_H$ clock which is locked to the auxiliary signal, rather than the main signal. The FIFO 354 is read using the display clock of $1024f_H$, which is locked to horizontal synchronizing component of the main video channel. The use of a multiple line memory (FIFO) which has independent read and write port clocks enables data which was orthogonally sampled at a first rate to be displayed orthogonally at a second rate. The asynchronous nature of the read and write clocks, however, does require that steps the undertaken to avoid read/write pointer collisions.

The gate array 300 is common to both wide screen processors 30 and 31. The main signal path 304, auxiliary signal path 306 and output signal path 312 are shown in block diagram form in FIG. 6. The gate array also comprises a clocks/sync circuit 320 and a WSP μP decoder 310. Data and address output lines of the WSP μP decoder 310, identified as WSP DATA, are supplied to each of the main circuits and paths identified above, as well as to the picture-in-picture processor 320 and resolution processing circuit 370. It will be appreciated that whether or not certain circuits are, or are not, defined as being part of the gate array is largely a matter of convenience for facilitating explanation of the inventive arrangements.

The gate array is responsible for expanding, compressing and cropping video data of the main video channel, as and if necessary to implement different picture display formats. The luminance component Y_MN is stored in a first in first out (FIFO) line memory 356 for a length of time depending on the nature of the interpolation of the luminance component. The combined chrominance components U/V_MN are stored in FIFO 358. Auxiliary signal luminance and chrominance components Y_PIP, U_PIP and V_PIP are developed by demultiplexer 355. The luminance component undergoes resolution processing, as desired, in circuit 357, and is expanded as necessary by interpolator 359, generating signal Y_AUX as an output.

In some instances, the auxiliary display will be as large as the main signal display, as shown for example in FIG. 1(d). The memory limitations associated with the picture-in-picture processor and video RAM 350 can provide an insufficient number of data points, or pixels for filling such a large display area. In those circumstances, resolution processing circuit 357 can be used to restored pixels to the auxiliary video signal to replace those lost during data compression, or reduction. The resolution processing may correspond to the resolution processing undertaken by circuit 370 shown in FIG. 4.

As an example, circuit 370 may be a dithering circuit and circuit 357 may be a dedithering circuit.

The auxiliary channel is sampled at $640f_H$ rate while the main channel is sampled at a $1024f_H$ rate. The auxiliary channel FIFO 354 converts the data from the auxiliary channel sample rate to the main channel clock rate. In this process, the video signal undergoes an 8/5 (1024/640) compression. This is more than the 4/3 compression necessary to correctly display the auxiliary channel signal. Therefore, the auxiliary channel must be expanded by the interpolator 359 to correctly display a 4×3 small picture. The interpolator 359 is controlled by interpolator control circuit 371, which is itself responsive to WSP μP 340. The amount of interpolator expansion required is 5/6. The expansion factor X is determined as follows:

$$X=(640/1024)*(4/3)=5/6$$

The chrominance components U_PIP and V_PIP are delayed by circuit 367 for a length of time depending on the nature of the interpolation of the luminance component, generating signals U_AUX and V_AUX as outputs. The respective Y, U and V components of the main and auxiliary signals are combined in respective multiplexers 315, 317 and 319 in the output signal path 312, by controlling the read enable signals of the FIFO's 354, 356 and 358. The multiplexers 315, 317 and 319 are responsive to output multiplexer control circuit 321. Output multiplexer control circuit 321 is responsive to the clock signal CLK, the start of line signal SOL, the H_COUNT signal, the vertical blanking reset signal and the output of the fast switch from the picture-in-picture processor and WSP μP 340. The multiplexed luminance and chrominance components Y_MX, U_MX and V_MX are supplied to respective digital/analog converters 360, 362 and 364 respectively. The digital to analog converters are followed by low pass filters 361, 363 and 365 respectively, shown in FIG. 4. The various functions of the picture-in-picture processor, the gate array and the data reduction circuit are controlled by WSP μP 340. The WSP μP 340 is responsive to the TV μP 216, being connected thereto by a serial bus. The serial bus may be a four wire bus as shown, having lines for data, clock signals, enable signals and reset signals. The WSP μP 340 communicates with the different circuits of the gate array through a WSP μP decoder 310.

In one case, it is necessary to compress the 4×3 NTSC video by a factor of 4/3 to avoid aspect ratio distortion of the displayed picture. In the other case, the video can be expanded to perform horizontal zooming operations usually accompanied by vertical zooming. Horizontal zoom operations up to 33% can be accomplished by reducing compressions to less than 4/3. A sample interpolator is used to recalculate the incoming video to a new pixel positions because the luminance video bandwidth, up to 5.5 MHz for S-VHS format, occupies a large percentage of the Nyquist fold over frequency, which is 8 MHz for a $1024f_H$ clock.

Figure 6:
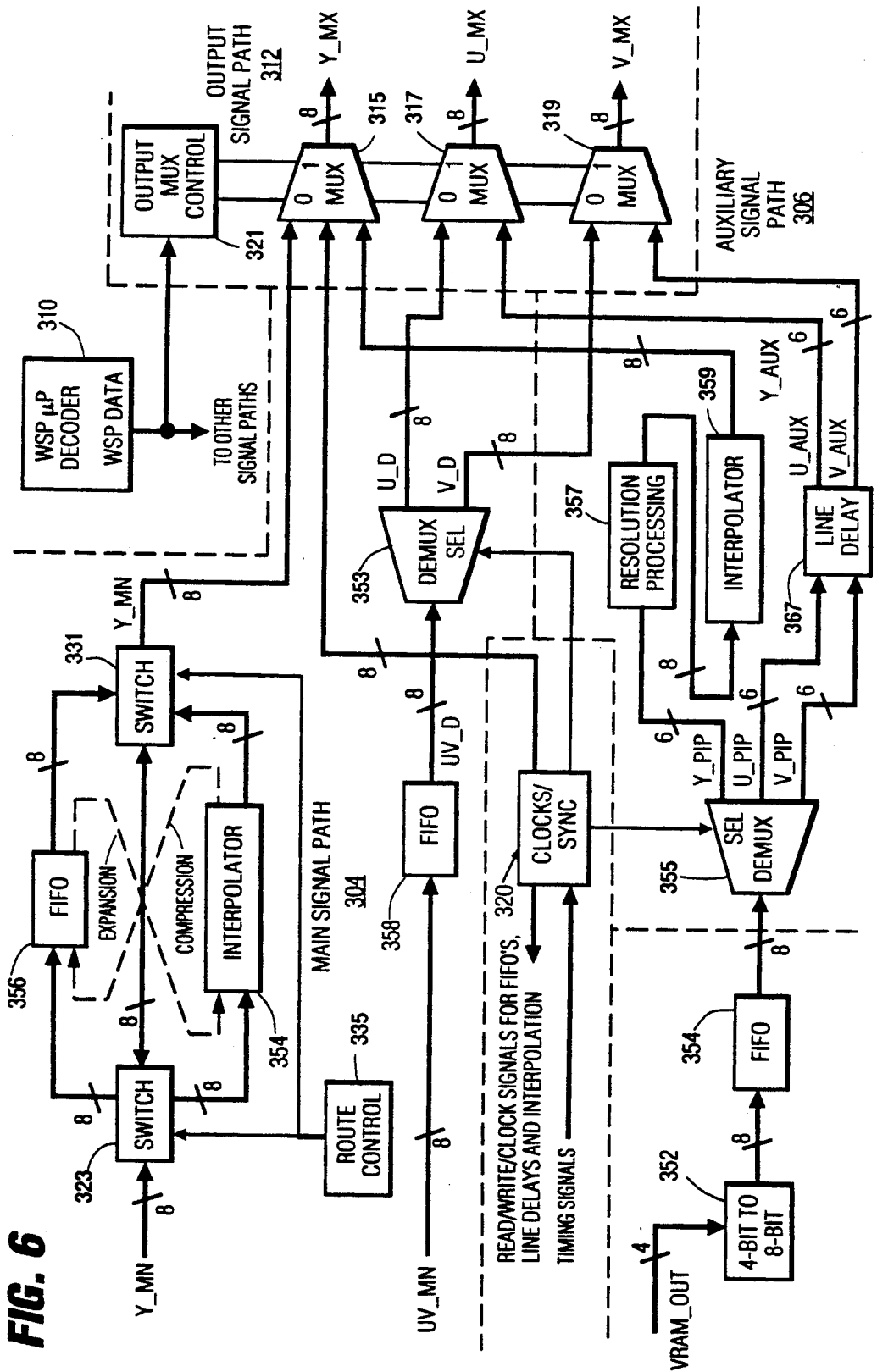
FIG. 6 is a block diagram of the gate array shown in FIG. 4 and illustrating the main, auxiliary and output signal paths.

As shown in FIG. 6, the luminance data Y_MN is routed through an interpolator 337 in the main signal path 304 which recalculates sample values based on the compression or the expansion of the video. The function of the switches or route selectors 323 and 331 is to reverse the topology of the main signal path 304 with respect to the relative positions of the FIFO 356 and the interpolator 337. In particular, these switches select whether the interpolator 337 precedes the FIFO 356, as required for compression, or whether the FIFO 356 precedes the interpolator 337, as required for expansion. The switches 323 and 331 are responsive to a route control circuit 335, which is itself responsive to the WSP μP 340. It will be remembered that the auxiliary video signal is compressed for storage in the video RAM 350, and only expansion is necessary for practical purposes. Accordingly, no comparable switching is required in the auxiliary signal path.

In order to implement video compressions through the use of a FIFO, for example, every fourth sample can be inhibited from being written into the FIFO 356. This constitutes a 4/3 compression. It is the function of the interpolator 337 to recalculate the luminance samples being written into the FIFO so that the data read out of the FIFO is smooth, rather than jagged. Expansions may be performed in exactly the opposite manner as compressions. In the case of compressions the write enable signal has clock gating information attached to it in the form of inhibit pulses. For expanding data, the clock gating information is applied to the read enable signal. This will pause the data as it is being read from the FIFO 356. In this case it is the function of the interpolator 337, which follows the FIFO 356 during this process, to recalculate the sampled data from jagged to smooth. In the expansion case the data must pause while being read from the FIFO 356 and while being clocked into the interpolator 337. This is different from the compression case where the data is continuously clocked through the interpolator 337. For both cases, compression and expansion, the clock gating operations can easily be performed in a synchronous manner, that is, events can occur based on the rising edges of the system clock $1024f_H$.

Interpolation of the auxiliary signal takes place in the auxiliary signal path 306. The PIP circuit 301 manipulates a 6 bit Y, U, V, 8:1:1 field memory, video RAM 350, to store incoming video data. The video RAM 350 holds two fields of video data in a plurality of memory locations. Each memory location holds eight bits of data. In each 8-bit location there is one 6-bit Y (luminance) sample (sampled at $640f_H$) and 2 other bits. These two other bits hold either fast switch data or part of a U or V sample (sampled at $80f_H$). The fast switch data values indicate which type of field was written into video RAM. Since there are two fields of data stored in the video RAM 350, and the entire video RAM 350 is read during the display period, both fields are read during the display scan. The PIP circuit 301 will determine which field will be read out of the memory to be displayed through the use of the fast switch data. The PIP circuit always reads the opposite field type that is being written to overcome a motion tear problem. If the field type being read is the opposite type than that being displayed, then the even field stored in the video RAM is inverted by deleting the top line of the field when the field is read out of memory. The result is that the small picture maintains correct interlace without a motion tear.

The clocks/sync circuit 320 generates read, write and enable signals needed for operating FIFOs 354, 356 and 358. The FIFOs for the main and auxiliary channels are enabled for writing data into storage for those portions of each video line which is required for subsequent display. Data is written from one of the main or auxiliary channels, but not both, as necessary to combine data from each source on the same video line or lines of the display. The FIFO 354 of the auxiliary channel is written synchronously with the auxiliary video signal, but is read out of memory synchronously with the main video signal. The main video signal components are read into the FIFOs 356 and 358 synchronously with the main video signal, and are read out of memory synchronously with the main video. How often the read function is switched back and forth between the main and auxiliary channels is a function of the particular special effect chosen.

Generation of different special effects such as cropped side-by-side pictures are accomplished through manipulating the read and write enable control signals for the line memory FIFOs. The process for this display format is illustrated in FIGS. 7 and 8. In the case of cropped side-by-side displayed pictures, the write enable control signal (WR_EN_AX) for 2048×8 FIFO 354 of the auxiliary channel is active for $(\frac{1}{2})^*(5/12)=5/12$ or approximately 41% of the display active line period (post speed up), or 67% of the auxiliary channel active line period (pre speed up), as shown in FIG. 7. This corresponds to approximately 33% cropping (approximately 67% active picture) and the interpolator expansion of the signal by 5/6. In the main video channel, shown in the upper part of FIG. 8, the write enable control signal (WR_EN_MN_Y) for the 910×8 FIFOs 356 and 358 is active for $(\frac{1}{2})^*(4/3)=0.67$ or 67% of the display active line period. This corresponds to approximately 33% cropping and a compression ratio of 4/3 being performed on the main channel video by the 910×8 FIFOs.

In each of the FIFOs, the video data is buffered to be read out at a particular point in time. The active region of time where the data may be read out from each FIFO is determined by the display format chosen. In the example of the side-by-side cropped mode shown, the main channel video is being displayed on the left hand half of the display and the auxiliary channel video is displayed on the right hand half of the display. The arbitrary video portions of the waveforms are different for the main and auxiliary channels as illustrated. The read enable control signal (RD_EN_MN) of the main channel 910×8 FIFOs is active for 50% of the display active line period of the display beginning with the start of active video, immediately following the video back porch. The auxiliary channel read enable control signal (RD_EN_AX) is active for the other 50% of the display active line period beginning with the failing edge of the RD_EN_MN signal and ending with the beginning of the main channel video front porch. It may be noted that write enable control signals are synchronous with their respective FIFO input data (main or auxiliary) while the read enable control signals are synchronous with the main channel video.

The display format shown in FIG. 1(d) is particularly desirable as it enables two nearly full field pictures to displayed in a side by side format. The display is particularly effective and appropriate for a wide format display ratio display, for example 16×9. Most NTSC signals are represented in a 4×3 format, which of course corresponds to 12×9. Two 4×3 format display ratio NTSC pictures may be presented on the same 16×9 format display ratio display, either by cropping the pictures by 33% or squeezing the pictures by 33%, and introducing aspect ratio distortion. Depending on user preference, the ratio of picture cropping to aspect ratio distortion may be set any where in between the limits of 0% and 33%. As an example, two side by side pictures may be presented as 16.7% squeezed and 16.7% cropped.

The horizontal display time for a 16×9 format display ratio display is the same as a 4×3 format display ratio display, because both have 62.5 microsecond nominal line length. Accordingly, an NTSC video signal must be sped up by a factor of 4/3 to preserve a correct aspect ratio, without distortion. The 4/3 factor is calculated as ratio of the two display formats:

$$4/3 = (16/9)/(4/3)$$

Variable interpolators are utilized in accordance with aspects of this invention to speed up the video signals. In the past, FIFOs having different clock rates at the inputs and outputs have been used to perform a similar function. By way of comparison, if two NTSC 4×3 format display ratio signals are displayed on a single 4×3 format display ratio display, each picture must be distorted or cropped, or some combination thereof, by 50%. A speed up comparable to that needed for a wide screen application is unnecessary.

Generally, the video display and deflection system is synchronized with the main video signal. The main video signal must be speeded up, as explained above, to fill the wide screen display. The auxiliary video signal must be vertically synchronized with the first video and the video display. The auxiliary video signal can be delayed by a fraction of a field period in a field memory, and then speeded up in a line memory. Synchronization of the auxiliary video data with main video data is accomplished by utilizing the video RAM 350 as a field memory and a first in first out (FIFO) line memory device 354 for speeding up the signal.

What is claimed is:

1. A television apparatus, comprising:
   video display means having a first format display ratio of width to height;
   means for receiving a first video signal representing a first picture;
   means for receiving a second video signal representing a second picture having a second ratio of width to height different than said first ratio;
   means for changing said ratio of width to height of said second picture; and,
   means for combining a portion of said first picture with a portion of said changed second picture for simultaneous display of said first and second picture portions.

2. The apparatus of claim 1, further comprising means for storing said changed second picture prior to said combination with said first picture.

3. The apparatus of claim 1, wherein said change is compression in both said width and height.

4. The apparatus of claim 1, wherein said first format display ratio of said video display means is wider than 4:3.

5. The apparatus of claim 1, wherein said first format display ratio of said video display means is approximately 16:9 and said second format display ratio is approximately 4:3.

6. The apparatus of claim 1, wherein said first format display ratio of said video display means is approximately 16:9 and said second format display ratio is approximately 2:1.

7. The apparatus of claim 1, wherein said second picture forms an inset within said first picture.

8. The apparatus of claim 1, wherein said first and second pictures are of substantially comparable size.

9. The apparatus of claim 1, wherein said changing means comprises:
   means for digitizing said second video signal;
   means for horizontally and vertically subsampling said second video signal at a first and second rates respectively; and,
   means for storing said subsamples from said second video signal.

10. A video display system, comprising:
    video display means having a first format display ratio of width to height;
    means for receiving a first video signal, defining a picture in a second format display ratio of width to height smaller than said first format display ratio;
    means for asymmetrically compressing said width and height of said picture; and,
    means for mapping said asymmetrically compressed picture onto said display means.

11. The system of claim 10, further comprising means for storing said asymmetrically compressed picture.

12. The system of claim 10, wherein said first format display ratio is approximately 16×9 and said second format display ratio is approximately 4×3.

13. The system of claim 12, further comprising means for combining said picture with another picture for simultaneous display of both said pictures on said display means.

14. The system of claim 10, wherein said compressing means compresses said picture by a factor of approximately 4:1 horizontally and by a factor of approximately 3:1 vertically.

15. The system of claim 10, wherein said picture forms an inset within another picture.

16. The system of claim 10, wherein said asymmetric compressing means comprises:
    means for digitizing said video signal;
    means for horizontally and vertically subsampling said video signal at a first and second rates respectively; and,
    means for storing said subsamples from said video signal.

17. The system of claim 10, wherein said picture is a combination of multiple pictures from more than one source.

18. The system of claim 10, wherein said picture is a combination of multiple pictures from one source.

19. A video signal processor for a video display apparatus comprising:
    means for digitizing substantially all of a video signal defining a substantially complete picture having a format display ratio of width to height; and
    means for selectively changing said width and height of said substantially complete picture by first and second factor respectively to control aspect ratio distortion of said picture; and,
    means for generating said aspect ratio controlled picture as an output for display by said video display apparatus.

20. The processor of claim 19, further comprising means for storing said aspect ratio controlled picture prior to generation of said output.

21. The processor of claim 19, wherein said first and second factors are different from one another.

22. The processor of claim 19, wherein said first and second factors are the same.

23. The processor of claim 19, wherein said picture is asymmetrically compressed.

24. The processor of claim 19, wherein said selective changing means comprises means for horizontally and vertically subsampling said digitized video signal at said first and second rates respectively.

25. The processor of claim 19, further comprising means for combining a portion of said second picture with a portion of said aspect ratio controlled picture for simultaneous display of said pictures.

26. The processor of claim 19, further comprising means for supplying said first and second factors to said changing means.

27. The processor of claim 21, wherein said selective changing means comprises means for horizontally and vertically subsampling said digitized video signal at said first and second rates respectively.

28. The processor of claim 27, further comprising means for combining a portion of a second picture with a portion of said aspect ratio controlled picture for simultaneous display of said pictures.

29. The processor of claim 28, further comprising means for supplying said first and second factors to said changing means.

* * * * *

UNITED STATES PATENT AND TRADEMARK OFFICE
CERTIFICATE OF CORRECTION

PATENT NO. : 5,329,369
DATED : July 12, 1994
INVENTOR(S) : Donald H. Willis et al.

It is certified that error appears in the above-indentified patent and that said Letters Patent is hereby corrected as shown below:

Column 22, line 40, delete "a".

Signed and Sealed this

Thirtieth Day of July, 1996

Attest:

BRUCE LEHMAN

*Attesting Officer*  Commissioner of Patents and Trademarks

(12) EX PARTE REEXAMINATION CERTIFICATE (8203rd)
United States Patent
Willis et al.

(10) Number: US 5,329,369 C1
(45) Certificate Issued: May 10, 2011

(54) ASYMMETRIC PICTURE COMPRESSION

(75) Inventors: Donald H. Willis, Indianapolis, IN (US); Barth A. Canfield, Indianapolis, IN (US)

(73) Assignee: Funai Electric Co., Ltd., Nakagaito, Dailo (JP)

Reexamination Request:
No. 90/010,021, Sep. 6, 2007
No. 90/010,074, Dec. 7, 2007

Reexamination Certificate for:
Patent No.: 5,329,369
Issued: Jul. 12, 1994
Appl. No.: 07/946,346
Filed: Nov. 9, 1992

Certificate of Correction issued Jul. 13, 1996.

(22) PCT Filed: May 29, 1991
(86) PCT No.: PCT/US91/03733
§ 371 (c)(1), (2), (4) Date: Nov. 9, 1992
(87) PCT Pub. No.: WO91/19384
PCT Pub. Date: Dec. 12, 1991

(51) Int. Cl.
H04N 5/262 (2006.01)
H04N 9/74 (2006.01)
H04N 3/223 (2006.01)

(52) U.S. Cl. .......... 348/556; 348/568; 348/578; 348/704; 348/E3.041; 348/E3.049; 348/35.111; 348/E5.112; 348/37.002; 348/E7.003; 348/E7.009

(58) Field of Classification Search .......... None
See application file for complete search history.

(56) References Cited

U.S. PATENT DOCUMENTS 3,706,851 A 12/1972 Froehlich et al.
4,079,413 A 3/1978 Yamashita (Continued)

FOREIGN PATENT DOCUMENTS

CN 87108261 A 7/1988

(Continued)

OTHER PUBLICATIONS

Barth Canfield, Closed Caption Decoding Using CPIP, Engineering Notebook. Property of Thomson Consumer Electronics, Inc.

(Continued)

*Primary Examiner*—Fred Ferris

(57) ABSTRACT

A wide screen television apparatus comprises a video display having a first format display ratio of width to height, for example approximately 16×9. A first video signal defines a first picture. A second video signal defines a second picture in a second format display ratio of width to height smaller than the first format display ratio, for example approximately 4×3. A video signal processor asymmetrically compresses the second picture, for example 4:1 horizontally and 3:1 vertically. A video memory stores lines of video of the asymmetrically compressed picture. Another video signal processor combines portions of lines of video in the first video signal with the stored lines of video of the asymmetrically compressed picture for simultaneous display of the first and second pictures. The asymmetrically compressed second picture is displayed without aspect ratio distortion. The second picture can form an inset within the first picture. A single picture display can itself comprise a full screen of pictures from one source of from multiple sources. A video signal processor for a video display apparatus comprises a circuit for selectively changing the width and height of a picture by first and second factors respectively to control aspect ratio distortion of the picture and a circuit for generating the aspect ratio controlled picture as an output for display by the video display apparatus. The processor includes a circuit for digitizing the video signal, for subsequent subsampling.

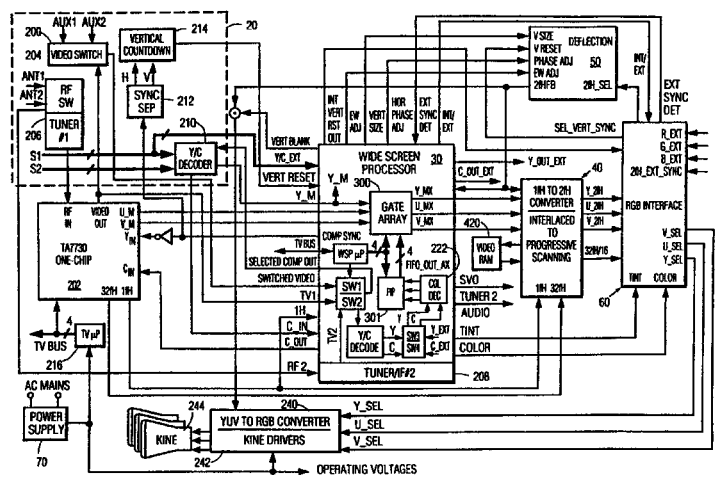

U.S. PATENT DOCUMENTS

| | | |
|---|---|---|
| 4,134,128 A | 1/1979 | Hurst |
| 4,163,249 A | 7/1979 | Michael et al. |
| 4,163,992 A | 8/1979 | Inaba et al. |
| 4,172,264 A | 10/1979 | Taylor et al. |
| 4,224,615 A | 9/1980 | Penz |
| 4,249,213 A | 2/1981 | Imaide et al. |
| 4,259,690 A | 3/1981 | Nakanishi et al. |
| 4,266,242 A | 5/1981 | McCoy |
| 4,267,560 A | 5/1981 | Ishikawa et al. |
| 4,281,345 A | 7/1981 | Warn et al. |
| 4,282,546 A | 8/1981 | Reitmeier |
| 4,302,776 A | 11/1981 | Taylor et al. |
| 4,356,511 A | 10/1982 | Tsujimura et al. |
| 4,385,324 A | 5/1983 | Shioda et al. |
| 4,399,462 A | 8/1983 | Balopole et al. |
| 4,443,819 A | 4/1984 | Funada et al. |
| 4,460,890 A | 7/1984 | Busby |
| 4,524,447 A | 6/1985 | Willis et al. |
| 4,556,900 A | 12/1985 | Willis |
| 4,556,906 A | 12/1985 | Dischert et al. |
| 4,563,617 A | 1/1986 | Davidson |
| 4,573,068 A | 2/1986 | Dorsey et al. |
| 4,573,080 A | 2/1986 | Maze |
| 4,591,758 A | 5/1986 | Barth et al. |
| 4,594,726 A | 6/1986 | Willis |
| 4,605,950 A | 8/1986 | Goldberg et al. |
| 4,605,963 A | 8/1986 | Reitmeier et al. |
| 4,618,858 A | 10/1986 | Belch |
| 4,622,577 A | 11/1986 | Reitmeier et al. |
| 4,623,915 A | 11/1986 | Bolger |
| 4,623,922 A | 11/1986 | Wischermann et al. |
| 4,631,751 A | 12/1986 | Anderson et al. |
| 4,651,195 A | 3/1987 | Stahler |
| 4,651,208 A | 3/1987 | Rhodes et al. |
| 4,652,908 A | 3/1987 | Fling et al. |
| 4,652,909 A | 3/1987 | Glenn |
| 4,654,695 A | 3/1987 | Fling |
| 4,656,515 A | 4/1987 | Christopher |
| 4,656,516 A | 4/1987 | Fling et al. |
| 4,656,664 A | 4/1987 | Anderson et al. |
| 4,660,081 A | 4/1987 | Heerah et al. |
| 4,661,987 A | 4/1987 | Anderson et al. |
| 4,663,660 A | 5/1987 | Fedele et al. |
| 4,665,433 A | 5/1987 | Hinson et al. |
| 4,668,989 A | 5/1987 | Mackereth et al. |
| 4,670,784 A | 6/1987 | Goldberg |
| 4,677,488 A | 6/1987 | Zato |
| 4,679,091 A | 7/1987 | Kikuchi et al. |
| 4,680,630 A | 7/1987 | Field et al. |
| 4,682,234 A | 7/1987 | Naimpally |
| 4,689,681 A | 8/1987 | Jackson |
| 4,694,414 A | 9/1987 | Christopher |
| 4,698,665 A | 10/1987 | de Haan et al. |
| 4,707,742 A | 11/1987 | Field et al. |
| 4,712,130 A | 12/1987 | Casey |
| 4,717,951 A | 1/1988 | Fling |
| 4,724,487 A | 2/1988 | Casey |
| 4,729,012 A | 3/1988 | Jose et al. |
| 4,740,836 A | 4/1988 | Craig |
| 4,743,970 A | 5/1988 | Barnett et al. |
| 4,746,979 A | 5/1988 | Kashigi et al. |
| 4,746,981 A | 5/1988 | Nadan et al. |
| 4,746,983 A | 5/1988 | Hakamada |
| 4,750,038 A | 6/1988 | Welles et al. |
| 4,750,039 A | 6/1988 | Willis |
| 4,758,893 A | 7/1988 | Lippel |
| 4,760,455 A | 7/1988 | Nagashima et al. |
| 4,761,587 A | 8/1988 | Wharton |
| 4,761,686 A | 8/1988 | Willis |
| 4,763,194 A | 8/1988 | Osman |
| 4,766,355 A | 8/1988 | Kadlec et al. |
| 4,768,093 A | 8/1988 | Prodan |
| 4,769,705 A | 9/1988 | Lendaro |
| 4,771,331 A | 9/1988 | Bierling et al. |
| 4,785,351 A | 11/1988 | Ishikawa et al. |
| 4,791,487 A | 12/1988 | Kozuki |
| 4,796,089 A | 1/1989 | Imai et al. |
| 4,800,430 A | 1/1989 | Murakami et al. |
| 4,811,103 A | 3/1989 | Casey |
| 4,817,182 A | 3/1989 | Adelson et al. |
| 4,821,086 A | 4/1989 | McNeely et al. |
| 4,827,343 A | 5/1989 | Naimpally |
| 4,829,378 A | 5/1989 | LeGall |
| 4,831,447 A | 5/1989 | Lake, Jr. |
| 4,833,463 A | 5/1989 | Dick et al. |
| 4,833,474 A | 5/1989 | Nagai et al. |
| 4,837,626 A | 6/1989 | Nishiyama et al. |
| 4,839,728 A | 6/1989 | Casey |
| 4,845,562 A | 7/1989 | Koslov et al. |
| 4,853,779 A | 8/1989 | Hammer et al. |
| 4,862,269 A | 8/1989 | Sonoda et al. |
| 4,866,509 A | 9/1989 | Guida |
| 4,870,357 A | 9/1989 | Young et al. |
| 4,878,117 A | 10/1989 | Ikehira et al. |
| 4,887,157 A | 12/1989 | Hartnack et al. |
| 4,890,162 A | 12/1989 | McNeely et al. |
| 4,891,702 A | 1/1990 | Nakayama et al. |
| 4,891,705 A | 1/1990 | Suzuki et al. |
| 4,893,123 A | 1/1990 | Boisson et al. |
| 4,893,185 A | 1/1990 | Fukushima et al. |
| 4,903,269 A | 2/1990 | Fedele |
| 4,908,874 A | 3/1990 | Gabriel |
| 4,916,525 A | 4/1990 | Drummond |
| 4,916,544 A | 4/1990 | Lienard et al. |
| 4,918,518 A | 4/1990 | Phillips |
| 4,920,407 A | 4/1990 | Stoddard |
| 4,924,309 A | 5/1990 | Hartnack et al. |
| 4,933,765 A | 6/1990 | Schiff et al. |
| 4,935,815 A | 6/1990 | Ichikawa et al. |
| 4,941,045 A | 7/1990 | Birch et al. |
| 4,951,149 A | 8/1990 | Faroudja |
| 4,953,023 A | 8/1990 | Kondo |
| 4,953,025 A | 8/1990 | Saitoh et al. |
| 4,956,638 A | 9/1990 | Larky et al. |
| 4,958,229 A | 9/1990 | Guillon et al. |
| 4,965,668 A | 10/1990 | Abt et al. |
| 4,971,448 A | 11/1990 | Van Zon et al. |
| 4,984,078 A | 1/1991 | Skinner et al. |
| 4,984,083 A | 1/1991 | Okamoto et al. |
| 4,985,766 A | 1/1991 | Morrison et al. |
| 4,987,493 A | 1/1991 | Canfield et al. |
| 4,991,012 A | 2/1991 | Yoshino et al. |
| 4,991,014 A | 2/1991 | Takahashi et al. |
| 4,992,874 A | 2/1991 | Willis et al. |
| 4,996,592 A | 2/1991 | Yoshida et al. |
| 4,998,171 A | 3/1991 | Kim et al. |
| 4,999,710 A | 3/1991 | Senso et al. |
| 5,005,080 A | 4/1991 | Kanda et al. |
| 5,008,752 A | 4/1991 | Van Nostrand |
| 5,016,106 A | 5/1991 | Yong-Je et al. |
| 5,018,090 A | 5/1991 | Shiratsuchi et al. |
| 5,019,903 A | 5/1991 | Dougall et al. |
| 5,021,883 A | 6/1991 | Sakamoto et al. |
| 5,021,887 A | 6/1991 | Park et al. |
| 5,025,315 A | 6/1991 | Johary et al. |
| 5,025,496 A | 6/1991 | Canfield |
| 5,029,006 A | 7/1991 | Katsumata et al. |
| 5,029,326 A | 7/1991 | Tabata |
| 5,031,044 A | 7/1991 | Canfield et al. |
| 5,032,907 A | 7/1991 | Isnardi |
| 5,047,857 A | 9/1991 | Duffield et al. |

| | | | | | | |
|---|---|---|---|---|---|---|
| 5,065,243 | A | 11/1991 | Katagiri | EP | 0341725 A1 | 11/1989 |
| 5,068,716 | A | 11/1991 | Takayama et al. | EP | 0357144 B1 | 3/1990 |
| 5,068,728 | A | 11/1991 | Macovski | EP | 0200330 B1 | 6/1991 |
| 5,068,729 | A | 11/1991 | Katznelson et al. | EP | 0196826 B1 | 7/1991 |
| 5,084,765 | A | 1/1992 | Morita et al. | EP | 0263670 B2 | 1/1992 |
| 5,097,332 | A | 3/1992 | Faroudja | EP | 0229526 B1 | 3/1993 |
| 5,111,297 | A | 5/1992 | Tsuji et al. | EP | 0343539 B1 | 5/1994 |
| 5,130,800 | A | 7/1992 | Johnson et al. | EP | 0276985 B1 | 8/1994 |
| 5,134,479 | A | 7/1992 | Ohishi | EP | 0318986 B1 | 3/1996 |
| 5,136,380 | A | 8/1992 | Cho et al. | EP | 0514819 B1 | 5/1996 |
| 5,136,398 | A | 8/1992 | Rodriguez-Cavazos et al. | EP | 0454414 B1 | 7/1997 |
| 5,138,455 | A | 8/1992 | Okumura et al. | EP | 0533738 B1 | 8/1997 |
| 5,144,437 | A | 9/1992 | Miyauchi et al. | EP | 0532682 B1 | 10/1997 |
| 5,144,438 | A | 9/1992 | Kim et al. | EP | 0589486 B1 | 1/1998 |
| 5,146,335 | A | 9/1992 | Kim et al. | EP | 0524625 B1 | 2/1999 |
| 5,148,163 | A | 9/1992 | Frindle et al. | FR | 2586332 | 2/1987 |
| 5,153,728 | A | 10/1992 | Nakayama et al. | GB | 2002989 A | 2/1979 |
| 5,166,786 | A | 11/1992 | Sakai et al. | GB | 2016857 A | 9/1979 |
| 5,166,809 | A | 11/1992 | Surbrook | GB | 1573105 | 8/1980 |
| 5,179,443 | A | 1/1993 | Sugimori et al. | GB | 2064913 A | 6/1981 |
| 5,182,644 | A | 1/1993 | Kimata et al. | GB | 2073536 A | 10/1981 |
| 5,194,937 | A | 3/1993 | Lee et al. | GB | 2103046 A | 2/1983 |
| 5,208,660 | A | 5/1993 | Yoshida | GB | 2153626 A | 8/1985 |
| 5,208,670 | A | 5/1993 | Sugimori et al. | GB | 2182522 A | 5/1987 |
| 5,216,505 | A | 6/1993 | Kageyama et al. | GB | 2187360 | 9/1987 |
| 5,218,436 | A | 6/1993 | Sugiyama et al. | GB | 2240002 | 7/1991 |
| 5,223,929 | A | 6/1993 | Sugimori et al. | JP | 53-29019 A | 3/1978 |
| 5,223,938 | A | 6/1993 | Mizutani et al. | JP | 53-51922 | 5/1978 |
| 5,231,491 | A | 7/1993 | Holoch et al. | JP | 54-156420 A | 12/1979 |
| 5,249,049 | A | 9/1993 | Kranawetter et al. | JP | 57-206178 | 12/1982 |
| 5,255,098 | A | 10/1993 | Poivet et al. | JP | 57-208772 | 12/1982 |
| 5,262,864 | A | 11/1993 | Saeger et al. | JP | 60-180383 | 9/1985 |
| 5,280,397 | A | 1/1994 | Rhodes | JP | 61-193580 A | 8/1986 |
| 5,280,928 | A | 1/1994 | Ueta et al. | JP | 61-206380 | 9/1986 |
| 5,285,282 | A | 2/1994 | Cavazos et al. | JP | 62-58984 | 4/1987 |
| 5,287,189 | A | 2/1994 | Ersoz et al. | JP | 62-076986 | 4/1987 |
| 5,290,498 | A | 3/1994 | Shiraki et al. | JP | 62-084665 | 4/1987 |
| 5,294,983 | A | 3/1994 | Ersoz et al. | JP | 62-262781 | 11/1987 |
| 5,309,234 | A | 5/1994 | Kranawetter et al. | JP | 62-263780 | 11/1987 |
| 5,310,330 | A | 5/1994 | Zweig et al. | JP | 62-263781 | 11/1987 |
| 5,311,309 | A | 5/1994 | Ersoz et al. | JP | 63-26174 | 2/1988 |
| 5,313,303 | A | 5/1994 | Ersoz et al. | JP | 63-146671 | 6/1988 |
| 5,340,527 | A | 8/1994 | Gibson et al. | JP | 63-146672 | 6/1988 |
| 5,345,270 | A | 9/1994 | Saeger et al. | JP | 63-148780 A | 6/1988 |
| 5,350,108 | A | 9/1994 | Friar et al. | JP | 63-185173 | 7/1988 |
| 5,351,135 | A | 9/1994 | Saeger | JP | 63-193779 | 8/1988 |
| 5,360,944 | A | 11/1994 | Springer et al. | JP | 63-207284 A | 8/1988 |
| 5,365,278 | A | 11/1994 | Willis | JP | 63-258173 A | 10/1988 |
| 5,374,963 | A | 12/1994 | Willis | JP | 63-263893 A | 10/1988 |
| 5,420,643 | A | 5/1995 | Romesburg et al. | JP | 63-282790 A | 11/1988 |
| 5,430,256 | A | 7/1995 | Taylor et al. | JP | 63-283281 | 11/1988 |
| 5,430,462 | A | 7/1995 | Katagiri et al. | JP | 1-117575 A | 5/1989 |
| 5,430,494 | A | 7/1995 | Saeger et al. | JP | 1-157181 | 6/1989 |
| 5,434,625 | A | 7/1995 | Willis | JP | 1-157182 | 6/1989 |
| 5,440,240 | A | 8/1995 | Wood et al. | JP | 1-157183 | 6/1989 |
| 5,486,871 | A | 1/1996 | Filliman et al. | JP | 1-194783 | 8/1989 |
| 5,525,984 | A | 6/1996 | Bunker | JP | 1-205688 | 8/1989 |
| 5,561,472 | A | 10/1996 | Maietta et al. | JP | 1-221067 A | 9/1989 |
| 5,805,148 | A | 9/1998 | Swamy et al. | JP | 01-221067 | 9/1989 |
| | | FOREIGN PATENT DOCUMENTS | | JP | 1-221067 | 9/1989 |
| | | | | JP | 1-276977 | 11/1989 |
| DE | | 3115367 C2 | 12/1983 | JP | 2-8265 | 1/1990 |
| DE | | 3637018 C2 | 4/1996 | JP | 2-33272 A | 2/1990 |
| EP | | 0237174 A2 | 7/1925 | JP | 2-45046 | 2/1990 |
| EP | | 0004798 | 10/1979 | JP | 2-52584 A | 2/1990 |
| EP | | 0053676 B1 | 3/1985 | JP | 2-65575 A | 3/1990 |
| EP | | 0162501 | 11/1985 | JP | 2-65576 A | 3/1990 |
| EP | | 0237174 A2 | 9/1987 | JP | 2-94781 A | 4/1990 |
| EP | | 0298362 | 1/1989 | JP | 2-107080 | 4/1990 |
| EP | | 0331963 A1 | 9/1989 | JP | 2-113694 A | 4/1990 |
| EP | | 0339675 B1 | 11/1989 | JP | 2-132980 A | 5/1990 |

| | | |
|---|---|---|
| JP | 02-179080 | 7/1990 |
| JP | 03-010481 | 1/1991 |
| JP | 03-101575 | 4/1991 |
| JP | 03-238985 | 10/1991 |
| JP | 04-027288 | 1/1992 |
| JP | 04-240982 | 8/1992 |
| JP | 04-321387 | 11/1992 |
| JP | 04-322577 | 11/1992 |
| JP | 4-345388 A | 12/1992 |
| JP | 04-361490 | 12/1992 |
| JP | 6502748 | 3/1994 |
| JP | 2-292978 A | 11/1998 |
| JP | 9-219744 A | 3/2004 |
| WO | WO-86/05644 A1 | 9/1986 |
| WO | WO-8900369 | 1/1989 |
| WO | WO-89/02691 A1 | 3/1989 |
| WO | WO-90/00845 A1 | 1/1990 |
| WO | WO-91/19378 A1 | 12/1991 |
| WO | WO-91/19384 A1 | 12/1991 |
| WO | WO-9119390 | 12/1991 |
| WO | WO-91/19390 A1 | 12/1991 |
| WO | WO-91/19394 A1 | 12/1991 |
| WO | WO-91/19395 A1 | 12/1991 |
| WO | WO-91/19397 A1 | 12/1991 |
| WO | WO-91/19400 A1 | 12/1991 |

OTHER PUBLICATIONS

Barth Canfield. CPIP; DPIP. Engineering Notebook: Jun. 20, 1989 to Apr. 20, 1990. Property of Thomson Consumer Electronics, Inc.

Videotaped Deposition of Donald Willis in the Matter of Certain Digital Television Products and Certain Products Containing Same and Methods of Using Same (transcript). Inv. No. 337–TA–617. May 1, 2008.

Videotaped Deposition of Harvey D. Fried in the Matter of Certain Digital Television Properties and Certain Products Containing Same and Methods of Using Same (transcript). Inv. No. 337–TA–617. Apr. 8, 2008.

Videotaped Deposition of Barth Canfield in the Matter of Certain Digital Television Products and Certain Products Containing Same and Methods of Using Same (transcript). Inv. No. 337–TA–617. Apr. 30, 2008.

Videotaped Deposition of Barth Canfield in the Matter of Certain Digital Television Products and Certain Products Containing Same and Methods of Using Same (transcript). Inv. No. 337–TA–617. Jun. 25, 2008. vol. 2.

Barth Canfield. Closed Caption Decoding Using CPIP. Engineering Notebook. Property of Thomson Consumer Electronics, Inc.

Barth Canfield. CPIP; DPIP. Engineering Notebook: Jun. 20, 1989 to Apr. 20, 1990. Property of Thomson Consumer Electronics, Inc.

Videotaped Deposition of Donald Willis in the Matter of Certain Digital Television Products and Certain Products Containing Same and Methods of Using Same (transcript). Inv. No. 337–TA–617. May 1, 2008.

Videotaped Deposition of Harvey D. Fried in the Matter of Certain Digital Television Properties and Certain Products Containing Same and Methods of Using Same (transcript). Inv. No. 337–TA–617. Apr. 8, 2008.

Videotaped Deposition of Barth Canfield in the Matter of Certain Digital Television Products and Certain Products Containing Same and Methods of Using Same (transcript). Inv. No. 337–TA–617. Apr. 30, 2008.

Videotaped Deposition of Barth Canfield in the Matter of Certain Digital Television Products and Certain Products Containing Same and Methods of Using Same (transcript). Inv. No. 337–TA–617. Jun. 25, 2008. vol. 2.

Canfield, B.A. et al. "Multi–feature Pix–in–Pix IC (CPIP) With Full Screen Pan and Zoom," presented at International Conference on Consumer Electronics, Rosemont, IL, Jun. 6–8, 1990, p. 82–83.

Commission Investigative Staff's Post–Hearing Brief in the matter of Certain Digital Televisions and Certain Products Containing Same and Methods of Using Same. United States International Trade Commission Investigation No. 337–TA–617. Sep. 23, 2008. 70 pages. (Redacted).

Commission Investigative Staff's Post–Hearing Reply Brief in the matter of Certain Digital Televisions and Certain Products Containing Same and Methods of Using Same. United States International Trade Commission Investigation No. 337–TA–617. Sep. 9, 2008. 48 pages. (Redacted).

Commission Investigative Staff's Pre–Hearing Statement in the matter of Certain Digital Televisions and Certain Products Containing Same and Methods of Using Same. United States International Trade Commission Investigation No. 337–TA–617. Jul. 21, 2008. 64 pages. (Redacted).

Deposition of Timothy J. Drabik, Ph.D. in the matter of Certain Digital Television and Certain Products Containing Same and Methods of Using Same. United States International Trade Commission Investigation No. 337–TA–617. Los Angeles, California. Wednesday, Jun. 25, 2008. 52 pages. (Redacted).

Expert Report of Dr. Brian Von Herzen on Non–Infringement of U.S. Patent No. 5,329,369 in the matter of Certain Digital Televisions and Certain Products Containing Same and Methods of Using Same. United States International Trade Commission Investigation No. 337–TA–617. Jun. 6, 2008. 84 pages. (Redacted).

Expert Report of Dr. Timothy J. Drabik Regarding Invalidity of U.S. Patent No. 5,329,369 in the matter of Certain Digital Televisions and Certain Products Containing Same and Methods of Using Same. United States International Trade Commission Investigation No. 337–TA–617. 522 pages. May 13, 2008. (Redacted).

Initial Determination in the matter of Certain Digital Televisions and Certain Products Containing Same and Methods of Using Same. United States International Trade Commission Investigation No. 337–TA–617. Nov. 17, 2008. 167 pages. (Public Version).

Notice of Commission Determination To Review In Part A Final Determination Finding A Violatioan Of Section 337; Schedule For Filing Written Submissions On The Issues Under Review And On Remedy, The Public Interest And Bonding in the matter of Certain Digital Televisions and Certain Products Containing Same and Methods of Using Same. United States International Trade Comission Investigation No. 337–TA–617. Feb. 11, 2009. 4 Pages. (Redacted).

Open Session in the matter of Certain Digital Televisions and Certain Products Containing Same and Methods of Using Same. United States International Trade Commission Investigation No. 337–TA–617. Friday, Aug. 22, 2008. vol. X. 116 pages. (Redacted).

Open Session in the matter of Certain Digital Televisions and Certain Products Containing Same and Methods of Using Same. United States International Trade Commmission Investigation No. 337–TA–617. Thursday, Aug. 14, 2008. vol. IV. 57 pages. (Redacted).

Open Session in the matter of Certain Digital Televisions and Certain Products Containing Same and Methods of Using Same. United States International Trade Commission Investigation No. 337–TA–617. Thursday, Aug. 21, 2008. vol. IX. 173 pages. (Redacted).

Open Session in the matter of Certain Digital Televisions and Certain Products Containing Same and Methods of Using Same. United States International Trade Commmission Investigation No. 337–TA–617. Tuesday, Aug. 19, 2008. vol. VII. 76 pages. (Redacted).

Open Session in the matter of Certain Digital Televisions and Certain Products Containing Same and Methods of Using Same. United States International Trade Commission Investigation No. 337–TA–617. Wednesday, Aug. 13, 2008. vol. III. 131 pages. (Redacted).

Open Session in the matter of Certain Digital Televisions and Certain Products Containing Same and Methods of Using Same. United States International Trade Commission Investigation No. 337–TA–617. Wednesday, Aug. 20, 2008. vol. VIII. 174 pages. (Redacted).

Petition of the Office of Unfair Import Investigations for Review of the Final Initial Determination in the matter of Certain Digital Televisions and Certain Products Containing Same and Methods of Using Same. United States International Trade Commission Investigation No. 337–TA–617. Dec. 1, 2008. 18 pages. (Redacted).

Post–Hearing Brief of Complainants Funai Electric Co., Ltd. and Funai Corporation in the matter of Certain Digital Televisions and Certain Products Containing Same and Methods of Using Same. United States International Trade Commission Investigation No. 337–TA–617. Sep. 9, 2008. 74 pages. (Redacted).

Prehearing Brief of Complainants Funai Electric Co., Ltd. and Funai Corporation in the matter of Certain Digital Televisions and Certain Products Containing Same and Methods of Using Same. United States International Trade Commission Investigation No. 337–TA–617. Jul. 14, 2008. 79 pages. (Redacted).

Reply in Support of Post–Hearing Brief of Complainants Funai Electric Co., Ltd. and Funai Corporation in the matter of Certain Digital Televisions and Certain Products Containing Same and Methods of Using Same. United States International Trade Commission Investigation No. 337–TA–617. Sep. 23, 2008. 47 pages. (Redacted).

Respondents' Joint Post–Hearing Statement in the matter of Certain Digital Televisions and Certain Products Containing Same and Methods of Using Same. United States International Trade Commission Investigation No. 337–TA–617. Sep. 9, 2008. 78 pages. (Redacted).

Respondents' Joint Pre–Hearing Statement in the matter of Certain Digital Televisions and Certain Products Containing Same and Methods of Using Same. United States International Trade Commission Investigation No. 337–TA–617. Jul. 11, 2008. 86 pages. (Redacted).

Respondents' Joint Reply Brief to Staff and Complainants' Post–Hearing Briefs in the matter of Certain Digital Televisions and Certain Products Containing Same and Methods of Using Same. United States International Trade Commission Investigation No. 337–TA–617. Sep. 23, 2008. 48 pages. (Redacted).

Respondents' Motion for Leave to File Supplemental Expert Report of Dr. Timothy J. Drabik Regarding Invalidity of U.S. Patent No. 5,329,369 in the matter of Certain Digital Televisions and Certain Products Containing Same and Methods of Using Same. United States International Trade Commission Investigation No. 337–TA–617. Jun. 4, 2008. 93 pages. (Redacted).

Respondents' Petition for Review of Judge Charneski's Initial Determination in the matter of Certain Digital Televisions and Certain Products Containing Same and Methods of Using Same. United States International Trade Commission Investigation No. 337–TA–617. Dec. 1, 2008. 131 pages. (Redacted).

Respondents' Response to Complainants' Petition for Review of Judge Charneski's Initial Determination in the matter of Certain Digital Televisions and Certain Products Containing Same and Methods of Using Same. United States International Trade Commission Investigation No. 337–TA–617. Dec. 9, 2008. 36 pages. (Redacted).

Respondents' Response to Staff's Petition for Review of Judge Charneski's Initial Determination in the matter of Certain Digital Televisions and Certain Products Containing Same and Methods of Using Same. United States International Trade Commission Investigation No. 337–TA–617. Dec. 9, 2008. 28 pages. (Redacted).

Response of the Office of Unfair Import Investigations to Complainants' and Respondents' Petitions for Review in the matter of Certain Digital Televisions and Certain Products Containing Same and Methods of Using Same. United States International Trade Commission Investigation No. 337–TA–617. Dec. 9, 2008. 70 pages. (Redacted).

Siemens (Jan. 11, 1993). "Display Processor, SDA 9280, Preliminary Specification," 26 pages.

Summary of the Response of the Office of Unfair Import Investigations to Complainants' and Respondents' Petitions for Review in the matter of Certain Digital Televisions and Certain Products Containing Same and Methods of Using Same. United States International Trade Commission Investigation No. 337–TA–617. Dec. 9, 2008. 14 pages. (Redacted).

Videotaped Deposition of Brian Von Herzen in the matter of Certain Digital Televisions and Certain Products Containing Same and Methods of Using Same (transcript). United States International Trade Commission Investigation No. 337–TA–617. Los Angeles, California. Thursday, Jun. 26, 2008. 45 pages. (Redacted).

Open/Closed Session (Dr. Timothy J. Drabik) in the matter of Certain Digital Televisions and Certain Products Containing Same and Methods of Using Same (Transcript). United States International Trade Commission Investigation No. 337–TA–617. Aug. 19, 2008 and Aug. 20, 2008. 12 pages.

Open/Closed Session (Brian Von Herzen) in the matter of Certain Digital Televisions and Certain Products Containing Same and Methods of Using Same (Condensed Transcript and Concordance). United States International Trade Commission Investigation No. 337–TA–617. Aug. 21, 2008. 6 pages.

European Patent Office Boards of Appeal Decision of Mar. 19, 2004 mailed Jul. 19, 2004, for European Patent Application No. 91912590.6 filed May 29, 1991, 18 pages.

European Patent Office Minutes of the Oral Proceedings of Mar. 19, 2004 mailed Mar. 23, 2004, for European Patent Application No. 91912590.6 filed May 29, 1991, 6 pages.

European Patent Office Order for Summons dated Aug. 1, 2004, for European Patent Application No. 91912590.6 filed May 29, 1991, 1 page.

European Patent Office Summons to Oral Proceedings Pursuant to Rule 71(1) EPC mailed Jan. 9, 2004, for European Patent Application No. 91912590.6 filed May 29, 1991, 11 pages.

Rittner, K. (Dec. 20, 2001). Letter to European Patent Office, re European Patent Application No. 91912590.6 filed May 29, 1991, 2 pages.

Rittner, K. (Oct. 29, 2002). Letter to European Patent Office, re European Patent Application No. 91912590.6 filed May 29, 1991, 1 page.

Thies, S. (Jun. 7, 2001). Letter to European Patent Office, re Grounds of Appeal, European Patent Application No. 91912590.6 filed May 29, 1991, 4 pages.

Morishita, M. et al. (May 1985). "MUSE System High Definition Television Receiver," *NEC Technical Journal* 38(5):41–46.1 (English Abstract Attached).

Abrial, A. et al. (Dec. 1988). "A 27–MHz Digital–to–Analog Video Processor," *IEEE Journal of Solid–State Circuit* 23(6): 1358–1369.

Analog Devices, Inc. (1996). "ADV7175/ADV7176: Integrated Digital CCIR–601 YCrCb to PAL/NTSC Video Encoder," *Analog Devices*, Rev. A, pp. 1–35.

Bancroft, G. et al. (1988). "3–D Graphics Applications in Fluid Flow Simulations," *Proceedings of the 2nd IEEE Conference on Computer Workstations*, pp. 142–147.

Baron, S. N. et al. (Aug. 30–Sep. 1, 1989). "An Evolutionary Approach to Advanced Television Services: The ACTV (Advanced Compatible Television) System," *Proceedings of the Third International Workshop on HDTV*, Turin, Italy, pp. 195–211.

Bezzan, C. (1990). "High Definition TV: Its History and Perspective," *IEEE Telecommunications Symposium* 1990, pp. 542–545.

Borses, D. (2004). "Video Fundamentals: Signal Processing for Digital TV," National Semiconductor Corporation, Power Point Presentation to IEEE OC Computer Society, 105 pages.

Bretl, W. (1990). "ATV/NTSC Format Converters," *IEEE Transactions on Consumer Electronnics* 36(3):269–283.

Brett, M.D. (Feb. 1989). "A Multi–Standard MAC Decoder," *Electronic Technology* 23:36–38.

Bromba, M. et al. (1990). "Picture in Picture: A Highly Integrated Circuit Simplifies the Picture–in–Picture Technique in Television Sets and Video Recorders," *Siemens Components* 25(1):17–21.

Burkert, M. et al. (Feb. 1990). "IC Set for a Picture–in–Picture System with On–Chip Memory," *IEEE Transactions on Consumer Electronics* 36(1):23–31.

Carley, L. R. (Jan. 1987). "An Oversampling Analog–to–Digital. Converter Topology for High–Resolution Signal Acquisition Systems," *IEEE Transactions on Circuits and Systems* CAS–34(1):83–90.

Chatel, J. (Aug. 30–Sep. 1, 1989). "Compatibility and Evolution in HDTV Studios," *Proceedings of the Third International Workshop on HDTV*, Turin, Italy, pp. 25–34.

Chiappano, G. et al. (1988). "Anti–Aliasing VLSI Digital Filters for Video Signal Coders," *IEEE International Symposium on Circuits and Systems(ISCAS '88)*, pp. 709–713.

Chmielewski, I. et al. (Aug. 30–Sep. 1, 1989). "Quality Improvement for a Digital HDTV Vision Mixer by Interpolation Techniques," *Proceedings of the Third International Workshop on HDTV*, Turin, Italy, pp. 39–47.

Connolly, W. G. (Aug. 30–Sep. 1, 1989). "High Definition Television: Current Equipment and Future Developments," *Proceedings of the Third International Workshop on HDTV*, Turin Italy, pp. 395–414.

Crochiere, R. E. et al. (Oct. 1975). "Optimum FIR Digital Filter Implementations for Decimation, Interpolation, and Narrow–Bank Filtering," *IEEE Transactions on Acoustics, Speech and Signal Processing* ASSP–23(5):444–456.

Dubois, E. et al. (Aug. 30–Sep. 1, 1989). "NTSC Compatible HDTV Transmission Methods Based on Subsampling," *Proceedings of the Third International Workshop on HDTV*, Turin, Italy, pp. 213–220.

Ernst, M. et al. (Aug. 30–Sep. 1, 1989). "A Universal Standards Converter Concept for HDTV Applications," *Proceedings of the Third International Workshop on HDTV*, Turin, Italy, pp. 51–59.

Faroujda, Y. C. (Feb. 1988). "NTSC and Beyond," *IEEE Transactions on Consumer Electronics* 34(1):166–178.

Fernandez, A. et al. (1987). "VLSI Memory Management for an Eight Gigabit/s Memory System," *SPIE Visual Communicatons and Image Processing II* 845:345–349.

Fernandez, A. et al. (Nov. 15–18, 1987). "A Raster Assembly Processor (RAP) for Integrated HDTV Display of Video and Image Windows," *IEEE Globecom '87*, Tokyo, Japan, pp. 731–739.

Fernando, G. M. X. et al. (Jun. 25–29, 1990). "Display Processing for HD–MAC," *4th International Colloquium on Advanced Television Systems*, Ottawa, Canada, pp. 3B.6.1–3B.6.15.

Fetter, W. et al. (Apr. 1984). "A Progression of Wide Angle Display Developments by Computer Graphics," *Displays*, 5 pages.

Field, K. (Jun. 25–29, 1990). "Standards Conversion," *4th International Colloquium on Advanced Television Systems*, Ottawa, Canada, pp. 4A.3:1–4A3.11.

Gaggioni, H. P. (Nov. 1987). "The Evolution of Video Technologies," *IEEE Communications Magazine* 25(11):20–36.

Garault, T. et al. (Feb. 1988). "A Digital. MAC Decoder for the Display of a 16/9 Aspect Ratio Picture on a Conventional TV Receiver," *IEEE Transactions on Consumer Electronics* 34(1):137–146.

Geiger, E. A. (1988). "Worldwide Multistandard TV–Sets in Lieu of a World TV–Standard," ICCE Luncheon Address, pp. XV–XVIII.

Hauser, M. W. (Jan./Feb. 1991). "Principles of Oversampling A/D Conversion," *Journal of the Audio Engineering Society* 39(1/2):3–26.

Hopkins, R. (Feb. 1988). "Advanced TV Systems," *IEEE Transactions on Consumer Electronics* 34(1):1–15.

International. Telecommunications Union. (1982). "Recommendation 601—Encoding Parameters of Digital Television for Studios (Question 25/11, Study Programmes 25G/11, 25H/11)," Rec. 601, pp. 271–273.

International. Telecommunicatons Union. (1982–1986–1990–1992–1994–1995–2007). "Recommendation ITU–R BT.601–6: Studio Encoding Parameters of Digital Television for Standard 4:3 and Wide–Screen 16:9 Aspect Ratios (Question ITU–R 1/6)," Rec. ITU–R BT.601–6, pp. 1–13.

Isnardi, M. A. et al. (Dec. 1987). "Encoding for Compatablity and Recoverability in the ACTV System," *IEEE Transactions on Broadcasting* BC–33(4):116–123.

Isnardi, M. A. et al. (Feb. 1988). "Decoding Issues in the ACTV System," *IEEE Transactions on Consumer Electronics* 34(1):111–120.

Itoga, M. et al. (Aug. 1989). "MUSE/NTSC Converter," *IEEE Transactions on Consumer Electronics* 35(3):142–152.

Izume, Y. et al. (Jun. 1990). "Development of the MUSE–525 Line Standard Converter," *Journal of the Institute of Television Engineers of Japan* 44(6):705–712. (English abstract attached).

Jurgen, R. K. (Apr. 1988). "High–Definition Television Update," *IEEE Spectrum*, pp. 59–62.

Jurgen, R. K. (Jan. 1989). "Consumer Electronics: The FCC Rules on Broadcast of Advanced Television Signals: Improved–Definition Television Receivers Available; Work on Active–Matrix Displays Accelerates; EIA Unveils Home Electronic Bus," *IEEE Spectrum*, 3 pages.

Kanatsugu, Y. et al. (Aug. 1989). "Development of MUSE Family Systems," *IEEE Transactions on Consumer Electronics* 35(3):153–159.

Kawai, K. et al. (Aug. 1989). "A Wide Screen EDTV," *IEEE Transactions on Consumer Electronics* 35(3):133–141.

Kawai, K. et al. (Aug. 1990). "A High Performance EDTV System," *IEEE Transactions on Consumer Electronics* 36(3):178–188.

Kimura, Y. et al. (Nov. 1990). "Video Signal Processing LSI for MUSE/NTSC Converter," *IEEE Transactions on Consumer Electronics* 36(4):847–853.

Lechner, B. J. (May 1990). "Advanced Television Systems for the U.S.A.," *Information Display*, pp. 13–16, 40.

Leonard, E. (Aug. 1978). "Considerations Regarding the Use of Digital Data to Generate Video Backgrounds," *SMPTE Journal* 87:499–504.

Leung, B. (1991). "The Oversampling Technique for Analog to Digital Conversion: A Tutorial Overview," *Analog Integrated Circuits and Signal Processing* 1:65–74.

LoCicero, J. L. et al. (May 1985). "A Compatible High–Definition Television System (SLSC) with Chrominance and Aspect Ratio Improvements," *SMPTE Journal*, pp. 546–558.

Marcone, G. et al. (Feb.–Mar. 1988). "Two Dimensional Interpolation for Standard Conversion between HDTV and Common TV," *Proceedings of the Second International Workshop on HDTV*, pp. 471–485.

Masuda, M. et al. (Feb. 1979). "Fully Digitized Color Picture in Picture Television System," *IEEE Transactions on Consumer Electronics* CE–25:152–159.

Matsumoto, K. et al. (Feb. 1988). "THPM 14.6: An 18b Oversampling A/D Converter for Digital Audio," *IEEE International Solid–State Circuits Conference (ISSCC '88)*, 5 pages.

Meeker, G. W. (Sep. 1988). "High Definition and High Frame Rate Compatible N.T.S.C. Broadcast Television System," *IEEE Transactions on Broadcasting* 34(3):313–322.

Mizutani, Y. et al. (Aug. 30–Sep. 1, 1989). "Scanning Line Conversion from MUSE to EDTV," *Proceedings of the Third International Workshop on HDTV*, Turin, Italy, pp. 657–664.

Nakagawa, I. et al. (Nov. 1986). "Development of HDTV Receiving Equipment Based on Band Compression Technique (MUSE)," *IEEE Transactions on Consumer Electronics* CE–32(4):759–768.

Nystrom, S. et al. (Jun. 25–29, 1990). "Investigations of an Improved PAL–System that Used HDTV as Source Material (Etude d'un Systeme Pal Ameliore Qui Pourrait Servir a La Diffusion d'Emissions En TVHD)," *4th International Colloquium on Advanced Television Systems, Ottawa, Canada*, pp. 5A.9.1–5A.9.10.

Ogino, M. et al. (Jun. 25–29, 1990). "Considerations on Required Property for HDTV Displays (L'Affichage Sur Ecran TVHD: Considerations Sur Les Qualites Requises)," *4th International Colloquium on Advanced Television Systems*, Ottawa, Canada, pp. 2B.1.1–2B.1.18.

Reitmeier, G. A. (Mar. 1981). "Spatial Compression and Expansion of Digital Television Images," *RCA Review* 42:3–59.

Richards, J. W. et al. (Aug. 30–Sep. 1, 1989). "A Prototype High Definition Multi–Effects Unit for Electronic Video Production," *Proceedings of the Third International Workshop on HDTV*, Turin, Italy, pp. 89–97.

Ruelberg, K.D. (Aug. 30–Sep. 1, 1989). "Geometric Processing of High Definition Television Images," *Proceedings of the Third International Workshop on HDTV*, Turin, Italy, pp. 831–839.

Sakurai, M. (Aug. 30–Sep. 1, 1989). "NTSC–HDTV Up–Converter," *Proceedings of the Third International Workshop on HDTV*, Turin, Italy, pp. 665–673.

Sandbank, C. (Aug. 30–Sep. 1, 1989). "Signal Processing of HDTV and the Market Place," *Proceedings of the Third International Workshop on HDTV*, Turin, Italy, pp. 377–389.

Schafer, R. W. et al. (Jun. 1973). "A Digital Processing Approach to Interpolation," *Proceedings of the IEEE* (61(6):692–702.

Scheffler, G. et al. (Sep. 21–25, 1990). "Modern DRAM Technology in the TV set: Improved Picture Quality and New Features," *International Broadcasting Convention (IBC 1990)*, Brighton, UK, pp. 316–320.

Seki, Y. et al. (Aug. 1990). "Video Signal Processing for HDTV Receiver," *Transactions on Consumer Electronics* 36(3): 198–205.

Stein, M. (Jul. 1992). "Fold it or Fix It: The Changing Face of Special Effects," *International Broacasting Convention (IBC 1992)*, Amsterdam, p. 422–426.

Tamitani, I. et al. (Aug. 30–Sep. 1, 1989). "A Real–Time HDTV Signal Processor—Architecture and Implementation –, " *Proceedings of the Third International Workshop on HDTV*, Turin, Italy, pp. 331–338.

Tanabe, N. et al. (Dec. 1–4, 1986). "How To Build a Mixed Mode Terminal—Basic Concepts and an Example—," *IEEE Global Telecommunicatons Conference*, Houston, TX, vol. 1 of 3, pp. 471–478.

Temes, G. C. et al. (1990). "A Tutorial Discusison of the Oversampling Method for A/D and D/A Conversion," *IEEE International Symposium on Circuits and Systems*, 4 pages.

Thomson Consumer Electronics Inc. (1990). "The CTC140 Picture in Picture System (CPIP) Technical Training Manual," Technical Publications and Training, Indianapolis, Indiana, pp. 1–17.

Trundle, E. (Aug. 1988). "Storing TV Pictures in Chips—Part 3: Picture–in–Picture Displays," *Television*, pp. 762–764.

Tsuchida, S. et al. (Aug. 1991). "Multi–Picture System for High Resolution Wide Aspect Ratio Screen," *IEEE Transactions on Consumer Electronics* 37(3):313–319.

Van Der Meer, J. et al. (Feb. 29–Mar. 2, 1988). "The Architecture of an HD–MAC Decoder," *Proceedings of the Second International Workshop on Signal Processing of HDTV*, L'Aquila, Italy, pp. 551–558.

Weber, D. M. (Aug. 13, 1984). "Digital Circuits Point Towards Better TV Sets," *Electronics Week*, pp. 49–53.

Wedam, W. F. (May 1988). "Future Trends in Television," *IEEE Transactions on Consumer Electronics* 34(2):279–284.

Werz, S. (1990). "Question of Picture Design for TV Systems with Wide Aspect Ratio," *Proceedings of the Third International Workshop on HDTV*, Turin, Italy, pp. 9–16.

Nadan, J. S. et al. (Aug. 1984). "Signal Processing for Wide–Screen Television: The Smart Receiver," *SMPTE Journal* 93(8):726–729.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 19-29 is confirmed.

Claims 1-18 are cancelled.

\* \* \* \* \*

US005329369C2

(12) EX PARTE REEXAMINATION CERTIFICATE (8614th)

United States Patent
Willis et al.

(10) Number: US 5,329,369 C2
(45) Certificate Issued: Oct. 4, 2011

(54) ASYMMETRIC PICTURE COMPRESSION

(75) Inventors: Donald H. Willis, Indianapolis, IN (US); Barth A. Canfield, Indianapolis, IN (US)

(73) Assignee: Funai Electric Co., Ltd., Nakagaito, Daito, Osaka (JP)

Reexamination Request:
No. 90/011,419, Feb. 8, 2011

Reexamination Certificate for:
Patent No.: 5,329,369
Issued: Jul. 12, 1994
Appl. No.: 07/946,346
Filed: Nov. 9, 1992

Reexamination Certificate C1 5,329,369 issued May 10, 2011

Certificate of Correction issued Jul. 13, 1996.

(22) PCT Filed: May 29, 1991

(86) PCT No.: PCT/US91/03733

§ 371 (c)(1),
(2), (4) Date: Nov. 9, 1992

(87) PCT Pub. No.: WO91/19384

PCT Pub. Date: Dec. 12, 1991

(51) Int. Cl.
*H04N 5/262* (2006.01)
*H04N 9/74* (2006.01)
*H04N 3/223* (2006.01)

(52) U.S. Cl. ........................ 348/556; 348/568; 348/578; 348/704; 348/E3.041; 348/E3.049; 348/E5.111; 348/E5.112; 348/E7.002; 348/E7.003; 348/E7.009

(58) Field of Classification Search ................... 358/183
See application file for complete search history.

(56) References Cited

U.S. PATENT DOCUMENTS

| 4,623,980 | A | * | 11/1986 | Vary | 708/313 |
| 4,656,515 | A | | 4/1987 | Christopher | |
| 4,701,934 | A | * | 10/1987 | Jasper | 375/147 |
| 4,999,701 | A | * | 3/1991 | Cavallerano et al. | 375/240.25 |
| 5,140,416 | A | * | 8/1992 | Tinkler | 348/33 |
| 5,159,438 | A | * | 10/1992 | Rabii | 348/445 |

FOREIGN PATENT DOCUMENTS

JP  H1-205688  8/1989

* cited by examiner

*Primary Examiner* — Karin M. Reichle

(57) ABSTRACT

A wide screen television apparatus comprises a video display having a first format display ratio of width to height, for example approximately 16×9. A first video signal defines a first picture. A second video signal defines a second picture in a second format display ratio of width to height smaller than the first format display ratio, for example approximately 4×3. A video signal processor asymmetrically compresses the second picture, for example 4:1 horizontally and 3:1 vertically. A video memory stores lines of video of the asymmetrically compressed picture. Another video signal processor combines portions of lines of video in the first video signal with the stored lines of video of the asymmetrically compressed picture for simultaneous display of the first and second pictures. The asymmetrically compressed second picture is displayed without aspect ratio distortion. The second picture can form an inset within the first picture. A single picture display can itself comprise a full screen of pictures from one source of from multiple sources. A video signal processor for a video display apparatus comprises a circuit for selectively changing the width and height of a picture by first and second factors respectively to control aspect ratio distortion of the picture and a circuit for generating the aspect ratio controlled picture as an output for display by the video display apparatus. The processor includes a circuit for digitizing the video signal, for subsequent subsampling.

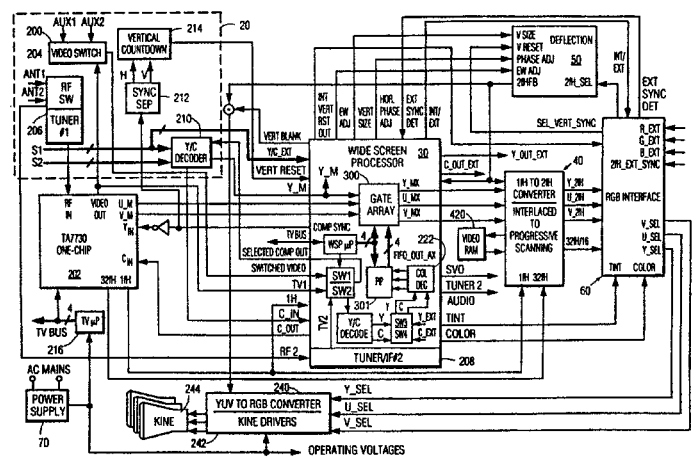

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 19-29 is confirmed.

Claims 1-18 were not reexamined.

* * * * *